United States Patent
Kurian

(10) Patent No.: US 12,028,464 B2
(45) Date of Patent: *Jul. 2, 2024

(54) ELECTRONIC SYSTEM FOR GENERATING AND TRACKING LINKED ELECTRONIC DIGITAL CERTIFICATES

(71) Applicant: BANK OF AMERICA CORPORATION, Charlotte, NC (US)

(72) Inventor: Manu Jacob Kurian, Dallas, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 317 days.

This patent is subject to a terminal disclaimer.

(21) Appl. No.: 17/394,798

(22) Filed: Aug. 5, 2021

(65) Prior Publication Data

US 2023/0046692 A1 Feb. 16, 2023

(51) Int. Cl.
*H04L 9/00* (2022.01)
*G06Q 40/08* (2012.01)
*H04L 9/32* (2006.01)

(52) U.S. Cl.
CPC .......... *H04L 9/3263* (2013.01); *G06Q 40/08* (2013.01); *H04L 9/50* (2022.05); *H04L 2209/64* (2013.01)

(58) Field of Classification Search
None
See application file for complete search history.

(56) References Cited

U.S. PATENT DOCUMENTS

| | | |
|---|---|---|
| 9,608,829 B2 | 3/2017 | Spanos et al. |
| 9,875,510 B1 | 1/2018 | Kasper |
| 10,325,257 B1 | 6/2019 | Winklevoss et al. |
| 10,373,159 B2 | 8/2019 | Ardashev et al. |
| 10,417,217 B2 | 9/2019 | Pierce et al. |

(Continued)

OTHER PUBLICATIONS

Bitcoinist article "Unicly to Allow Users to Combine, Fractionalize, and Trade NFTs with Guaranteed Liquidity" dated Apr. 12, 2021 as verified by the Internet Archive (6 pages) https://web.archive.org/web/20210412175740/https://bitcoinist.com/unicly-to-allow-users-to-combine-fractionalizeand-trade-nft/ (Year: 2021).

(Continued)

*Primary Examiner* — Fatoumata Traore
(74) *Attorney, Agent, or Firm* — Moore & Van Allen PLLC; Nicholas C. Russell

(57) ABSTRACT

Systems, computer program products, and methods are described herein for the generating and tracking linked electronic digital certificates. The present invention may be configured to generate a first electronic digital certificate having first properties and being associated with a first artifact owned by a first group of users, store the first electronic digital certificate, and record first interests of the first group of users in the first electronic digital certificate. The present invention may be configured to receive a request from a second group of users to generate a second electronic digital certificate, where the request includes a subset of the first properties for generation in the second electronic digital certificate. The present invention may be configured to generate the second electronic digital certificate, record second interests of the second group of users in the second electronic digital certificate, and link the first interests and the second interests.

15 Claims, 7 Drawing Sheets

(56) References Cited

U.S. PATENT DOCUMENTS

| | | | |
|---|---|---|---|
| 10,580,100 | B2 | 3/2020 | Pierce et al. |
| 10,708,042 | B1 | 7/2020 | Rubenstein et al. |
| 10,834,062 | B2 | 11/2020 | Androulaki et al. |
| 10,839,379 | B2 | 11/2020 | Pierce et al. |
| 11,108,544 | B2* | 8/2021 | Vouk ................ H04L 63/12 |
| 11,115,804 | B2 | 9/2021 | Mercuri |
| 11,509,484 | B1* | 11/2022 | Griffin ............... H04L 9/3268 |
| 11,568,398 | B1 | 1/2023 | Winklevoss et al. |
| 11,823,180 | B1 | 11/2023 | Trinh |
| 2006/0106718 | A1 | 5/2006 | Spellman et al. |
| 2015/0310497 | A1 | 10/2015 | Valin et al. |
| 2016/0292680 | A1* | 10/2016 | Wilson, Jr. ........... H04L 9/3247 |
| 2017/0046792 | A1 | 2/2017 | Haldenby et al. |
| 2017/0330174 | A1 | 11/2017 | Demarinis et al. |
| 2017/0331896 | A1 | 11/2017 | Holloway et al. |
| 2018/0322485 | A1 | 11/2018 | Jayaram et al. |
| 2018/0322491 | A1* | 11/2018 | Madisetti .......... G06Q 20/3823 |
| 2019/0244292 | A1 | 8/2019 | Jayaram et al. |
| 2020/0059364 | A1 | 2/2020 | Konda et al. |
| 2020/0162448 | A1* | 5/2020 | Dasika Venkata Devi .................. H04L 67/306 |
| 2020/0193516 | A9 | 6/2020 | De Jong et al. |
| 2020/0311811 | A1 | 10/2020 | Snyder et al. |
| 2020/0342359 | A1 | 10/2020 | Hu et al. |
| 2020/0342539 | A1 | 10/2020 | Doney |
| 2021/0035092 | A1 | 2/2021 | Pierce et al. |
| 2021/0097532 | A1 | 4/2021 | Mahasuverachai |
| 2021/0135880 | A1* | 5/2021 | Cheng ................ H04L 9/3247 |
| 2021/0142405 | A1 | 5/2021 | Sahagen |
| 2021/0150626 | A1 | 5/2021 | Robotham |
| 2021/0184834 | A1 | 6/2021 | Devalve et al. |
| 2021/0184863 | A1* | 6/2021 | Shahin ............... G06Q 20/3825 |
| 2021/0256070 | A1 | 8/2021 | Tran et al. |
| 2022/0122050 | A1 | 4/2022 | Pacella et al. |
| 2022/0374888 | A1 | 11/2022 | Lackey |
| 2023/0142659 | A1 | 5/2023 | Song |

OTHER PUBLICATIONS

CoreLedger: "How Blockchain Can Divide Indivisible Goods for Shared Ownership" Published Feb. 6, 2019 (pp. 1-5) https://medium.com/coreledger/how-blockchain-can-divide-indivisible-goods-for-shared-ownership-78c2aff048c (Year: 2019).

Mohit Kumar. "4 key components to build fractional ownership on the blockchain" Published Apr. 2, 2019 (pp. 1-6) https://medium.com/jalan-technology-consulting/4-key-components-to-build-fractional-ownership-on-the-blockchaina708b6dd6b51 (Year: 2019).

Antony Lewis and Mark Wightman. "Asset Fractionalisation—What, Why, and the Future" Published Jul. 23, 2019 (5 pages) https://r3.com/blog/asset-fractionalisation-what-why-and-the-future/ (Year: 2019).

Eric C. Jansen. "Tokenized Art: A New Alternative Investment?" Published Jul. 3, 2019 (8 pages) https://www.finivi.com/ tokenized-art-alternative-investment/ (Year: 2019).

Kayleigh Barber. "WTF is an NFT?" Article Published Mar. 11, 2021 (13 pages) https://digiday.com/media/wtf-is-an-nft/ (Year: 2021).

William Entriken, Dieter Shirley, Jacob Evans, Nastassia Sachs. "ERC-721: Non-Fungible Token Standard" Published Jan. 24, 2018 (12 pages) https://eips.ethereum.org/EIPS/eip-721 (Year: 2018).

Witek Radomski, Andrew Cooke, Phillipe Castonguay, James Therien, Eric binet, Ronan Snadford. "ERC-1155: Multi Token Standard" Published Jun. 17, 2018 (25 pages) https://eips.ethereum.org/EIPS/eip-1155 (Year: 2018).

* cited by examiner

ELECTRONIC SYSTEM FOR GENERATING AND TRACKING LINKED ELECTRONIC DIGITAL CERTIFICATES

FIELD OF THE INVENTION

The present invention embraces an electronic system for generating and tracking linked electronic digital certificates.

BACKGROUND

An owner of an artifact or resource may wish to distribute ownership of the artifact or resource to multiple users. For example, when passing down family heirlooms an owner may wish to split ownership of one artifact or resource amongst multiple heirs. An owner or owners of a collection of artifacts or resources may wish to collect the artifacts or resources into one unit, where each artifact or resource may be owned by different owners. For example, when an artist creates a collection of art with more than one art piece, the artist may wish to link the various art pieces to the collection. An owner, or group of owners, may wish to link ownership of an artifact to another artifact in which they have an interest.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. This summary presents some concepts of one or more embodiments of the present invention in a simplified form as a prelude to the more detailed description that is presented later.

In one aspect, a system for distributing electronic digital certificates is presented. The system may include at least one non-transitory storage device and at least one processing device coupled to the at least one non-transitory storage device, where the at least one processing device may be configured to: generate an electronic digital certificate associated with an artifact, where a user owns the artifact; store the electronic digital certificate on a distributed ledger, where the electronic digital certificate includes a smart contract; and record on the distributed ledger, an interest of the user in the electronic digital certificate. The at least one processing device may be further configured to: receive a request from the user of the electronic digital certificate to divide ownership of the electronic digital certificate, where the request includes information identifying a group of users; determine, based on the request from the user, shares in the electronic digital certificate for the group of users by determining for each user of the group of users a share of the shares; and record on the distributed ledger and based on the shares, interests of the group of users in the electronic digital certificate.

In some embodiments, the smart contract may include an assignment of rights to a verified authority of the electronic digital certificate, where the rights include a right to determine whether to authorize a proposed transfer of ownership of the electronic digital certificate. In some embodiments, the smart contract includes a set of rules governing proposed transfers of the electronic digital certificate and the shares. Additionally, or alternatively, each share, of the shares, may not be equal to another share, of the shares.

In some embodiments, the at least one processing device is configured to: receive, from the group of users, another request to transfer ownership to another user; compress the recorded interests of the group of users; store the compressed recorded interests on the distributed ledger; and record, on the distributed ledger and based on the other request, another interest of the other user. Additionally, or alternatively, the at least one processing device is further configured to, when compressing the recorded interests of the group of users, merge the shares in the electronic digital certificate. In some embodiments, the distributed ledger may include a compressed chain of ownership of the electronic digital certificate.

In some embodiments, the at least one processing device is further configured to: provide, to another system associated with an insuring entity, a unique identifier of the electronic digital certificate; receive, from the other system, information identifying an insurance policy; store, on the distributed ledger, the information identifying the insurance policy; and associate, on the distributed ledger, the stored information identifying the insurance policy with the electronic digital certificate. In some embodiments, the artifact may include a physical artifact or a digital artifact.

In another aspect, a computer program product for the distribution of electronic digital certificates is presented. The computer program product may include a non-transitory computer-readable medium including code causing a first apparatus to: generate an electronic digital certificate associated with an artifact, where a user owns the artifact; store the electronic digital certificate on a distributed ledger, where the electronic digital certificate includes a smart contract; and record on the distributed ledger, an interest of the user in the electronic digital certificate. The computer program product may include a non-transitory computer-readable medium including code causing the first apparatus to: receive a request form the user of the electronic digital certificate to divide ownership of the electronic digital certificate, where the request includes information identifying a group of users; determine, based on the request from the user, shares in the electronic digital certificate for the group of users by determining for each user of the group of users a share of the shares; and record, on the distributed ledger and based on the shares, interests of the group of users in the electronic digital certificate.

In some embodiments, the smart contract may include an assignment of rights to a verified authority of the electronic digital certificate, where the rights include a right to determine whether to authorize a proposed transfer of ownership of the electronic digital certificate. In some embodiments, the smart contract may include a set of rules governing proposed transfers of the electronic digital certificate and the shares. Additionally, or alternatively, each share, of the shares, may not be equal to another share, of the shares.

In some embodiments, the non-transitory computer-readable medium may include code causing the first apparatus to: receive, from the group of users, another request to transfer ownership to another user; compress the recorded interests of the group of users; store the compressed recorded interests on the distributed ledger; and record, on the distributed ledger and based on the other request, another interest of the other user. Additionally, or alternatively, the non-transitory computer-readable medium may include code causing the first apparatus to, when compressing the recorded interests of the group of users, merge the shares in the electronic digital certificate. In some embodiments, the distributed ledger may include a compressed chain of ownership of the electronic digital certificate. In some embodiments, the artifact may include at least one of a physical artifact or a digital artifact. In some embodiments, the non-transitory computer-readable medium may include code causing the first apparatus to: provide, to another system associated with an insuring entity, a unique identifier of the electronic digital certificate; receive, from the other system, information identifying an insurance policy; store, on the distributed ledger, the information identifying the insurance policy; and associate, on the distributed ledger, the stored information identifying the insurance policy with the electronic digital certificate.

In yet another aspect, a method for distributing electronic digital certificates is provided. The method may include: generating an electronic digital certificate associated with an artifact, where a user owns the artifact; storing the electronic digital certificate on a distributed ledger, where the electronic digital certificate includes a smart contract; recording, on the distributed ledger, an interest of the user in the electronic digital certificate. The method may include: receiving a request from the user to divide ownership of the electronic digital certificate, where the request includes information identifying a group of users; determining, based on the request from the owner, shares in the electronic digital certificate for the group of users by determining for each user of the group of users a share of the shares; and recording, on the distributed ledger and based on the shares, interests of the group of users in the electronic digital certificate.

In some embodiments, the smart contract may include an assignment of rights to a verified authority of the electronic digital certificate, where the rights include a right to determine whether to authorize a proposed transfer of ownership of the electronic digital certificate. In some embodiments, the smart contract may include a set of rules governing proposed transfers of the electronic digital certificate and the shares. In some embodiments, the method may include: receiving, from the group of users another request to transfer ownership to another user; compressing the recorded interests of the group of users; storing the compressed recorded interests on the distributed ledger; and recording on the distributed ledger and based on the other request, another interest of the other user. Additionally, or alternatively, the method may include, when compressing the recorded interests of the group of users, merging the shares in the electronic digital certificate.

In yet another aspect, a system for distributing electronic digital certificates is presented. The system may include at least one non-transitory storage device and at least one processing device coupled to the at least one non-transitory storage device, where the at least one processing device may be configured to: generate electronic digital certificates associated with artifacts by generating, for each artifact of the artifacts, an electronic digital certificate, where each artifact, of the artifacts, is owned by a user of a group of users. The at least one processing device may be configured to store the electronic digital certificate on a distributed ledger and record, on the distributed ledger, interests of the group of users in the electronic digital certificate. The at least one processing device may be configured to: receive, from at least one user of the group of users, a request to combine the electronic digital certificates, where the request includes information identifying electronic digital certificates; generate, based on the request and based on the electronic digital certificates, a combined electronic digital certificate; store the combined electronic digital certificate on the distributed ledger, where the combined electronic digital certificate includes a smart contract, and where the smart contract links each of the electronic digital certificates to the combined electronic digital certificate; and record, on the distributed ledger, interests of the group of users in the combined electronic digital certificate.

In some embodiments, the at least one processing device may be configured to, after receiving the request to combine the electronic digital certificates, verify, based on the distributed ledger, ownership of the electronic digital certificates and, when generating the combined electronic digital certificate, only generate the combined electronic digital certificate based on verifying the ownership. Additionally, or alternatively, the at least one processing device may be configured to determine, based on the request, shares in the combined electronic digital certificate for the group of users by determining for each user of the group of users a share of the shares and record, on the distributed ledger and based on the shares, interests of the group of users in the combined electronic digital certificate.

In some embodiments, the at least one processing device may be configured to determine values for the electronic digital certificates and, when determining the shares in the combined electronic digital certificate for the group of users, determine, for each user of the group of users, the share of the shares based on the values for the electronic digital certificates. In some embodiments, the smart contract may include an assignment of rights to a verified authority of the combined electronic digital certificate. In some embodiments, the rights may include a right to determine whether to authorize a proposed transfer of ownership of the electronic digital certificates and the combined electronic digital certificate. In some embodiments, the smart contract may include a set of rules governing proposed transfers of the electronic digital certificates and the combined electronic digital certificate.

In some embodiments, the at least one processing device may be configured to: receive another request, from a first user of the group of users, to transfer ownership of the combined electronic digital certificate to a new user or a new group of users; compress the recorded interests of the group of users; store the compressed recorded interests of the group of users on the distributed ledger; and record, on the distributed ledger and based on the other request, other interests of the new user or the new group of users in the combined electronic digital certificate. In some embodiments, the distributed ledger may include a compressed chain of ownership of the electronic digital certificates.

In some embodiments, the first electronic digital certificate of the electronic digital certificates may include a first smart contract, where the first smart contract includes an assignment of rights to a verified authority of the first electronic digital certificate, and where the rights include a right to determine whether to authorize a proposed transfer of ownership of the first electronic digital certificate. Additionally, or alternatively, the first smart contract may include a set of rules governing proposed transfers of the first electronic digital certificate.

In some embodiments, the at least one processing device may be configured to receive another request, from a first user of the group of users, to transfer ownership of a first electronic digital certificate to another user. In some embodiments, the at least one processing device may be configured to: compress a recorded interest of the first user in the first electronic digital certificate; store the compressed recorded interest on the distributed ledger; and record, on the distributed ledger and based on the other request, another interest of the other user in the first electronic digital certificate.

In some embodiments, the at least one processing device may be configured to: provide, to another system associated with an insuring entity, unique identifiers of the electronic digital certificates; receive, from the other system, information identifying an insurance policy; store, on the distributed ledger, the information identifying the insurance policy; and associate, on the distributed ledger, the stored information identifying the insurance policy.

In yet another aspect, a computer program product for distributing electronic digital certificates is presented. The computer program product may include a non-transitory computer-readable medium including code causing a first apparatus to generate electronic digital certificates associated with artifacts by generating, for each artifact of the artifacts, an electronic digital certificate, where each artifact, of the artifacts, is owned by a user of a group of users. The non-transitory computer-readable medium may include code causing a first apparatus to store the electronic digital certificate on a distributed ledger and record, on the distributed ledger, interests of the group of users in the electronic digital certificate. The non-transitory computer-readable medium may include code causing a first apparatus to: receive, from at least one user of the group of users, a request to combine the electronic digital certificates, where the request includes information identifying electronic digital certificates; generate, based on the request and based on the electronic digital certificates, a combined electronic digital certificate; store the combined electronic digital certificate on the distributed ledger, where the combined electronic digital certificate includes a smart contract, and where the smart contract links each of the electronic digital certificates to the combined electronic digital certificate; and record, on the distributed ledger, interests of the group of users in the combined electronic digital certificate.

In some embodiments, the non-transitory computer-readable medium may include code causing the first apparatus to determine, based on the request, shares in the combined electronic digital certificate for the group of users by determining for each user of the group of users a share of the shares and record, on the distributed ledger and based on the shares, interests of the group of users in the combined electronic digital certificate. Additionally, or alternatively, the non-transitory computer-readable medium may include code causing the first apparatus to, after receiving the request to combine the electronic digital certificate, verify, based on the distributed ledger, ownership of the electronic digital certificates and, when generating the combined electronic digital certificate, only generate the combined electronic digital certificate based on verifying the ownership. In some embodiments, the non-transitory computer-readable medium may include code causing a first apparatus to determine values for the electronic digital certificates and, when determining the shares in the combined electronic digital certificate for the group of users, determine, for each user of the group of users, the share of the shares based on the values for the electronic digital certificate.

In some embodiments, the smart contract may include an assignment of rights to a verified authority of the combined electronic digital certificate, where the rights include a right to determine whether to authorize a proposed transfer of ownership of the electronic digital certificates and the combined electronic digital certificate. Additionally, or alternatively, the smart contract may include a set of rules governing proposed transfers of the electronic digital certificates and the combined electronic digital certificate.

In some embodiments, the non-transitory computer-readable medium may include code causing the first apparatus to: receive another request, from a first user of the group of users, to transfer ownership of the combined electronic digital certificate to a new user or a new group of users; compress the recorded interests of the group of users; store the compressed recorded interests of the group of users on the distributed ledger; and record, on the distributed ledger and based on the other request, other interests of the new user or the new group of users in the combined electronic digital certificate. In some embodiments, the distributed ledger may include a compressed chain of ownership of the electronic digital certificates.

In some embodiments, a first electronic digital certificate of the electronic digital certificates may include a first smart contract. In some embodiments, the first smart contract may include an assignment of rights to a verified authority of the first electronic digital certificate, where the rights include a right to determine whether to authorize a proposed transfer of ownership of the first electronic digital certificate. Additionally, or alternatively, the first smart contract comprises a set of rules governing proposed transfer of the first electronic digital certificate.

In some embodiments, the non-transitory computer-readable medium comprises code causing the first apparatus to receive another request, from a first user of the group of users, to transfer ownership of a first electronic digital certificate to another user; compress a recorded interest of the first user in the first electronic digital certificate; store the compressed recorded interest on the distributed ledger; and record, on the distributed ledger and based on the other request, another interest of the other user in the first electronic digital certificate.

In yet another aspect, a method for distributing electronic digital certificate is presented. The method may include generating electronic digital certificates associated with artifacts by generating, for each artifact of the artifact, an electronic digital certificate, where each artifact, of the artifacts, is owned by a user of a group of users. The method may include storing the electronic digital certificates on a distributed ledger and recording, on the distributed ledger, interests of the group of users in the electronic digital certificates. The method may include: receiving, from at least one user of the group of users, a request to combine the electronic digital certificates, where the request includes information identifying the electronic digital certificates; generating, based on the request and based on the electronic digital certificates, a combined electronic digital certificate; storing the combined electronic digital certificate on the distributed ledger, where the combined electronic digital certificate includes a smart contract, and where the smart contract links each of the electronic digital certificates to the combined electronic digital certificate; and recording, on the distributed ledger, interests of the group of users in the combined electronic digital certificate.

In yet another aspect, a system for distributing electronic digital certificates is presented. The system may include at least one non-transitory storage device and at least one processing device coupled to the at least one non-transitory storage device, where the at least one processing device may be configured to: generate a first electronic digital certificate associated with a first artifact, where the first artifact is owned by a group of users, and where the first electronic digital certificate has first properties; store the electronic digital certificate on a distributed ledger; and record, on the distributed ledger, first interests of the first group of users in the first electronic digital certificate. The at least one processing device may be configured to receive, from a second group of users, a request to generate a second electronic digital certificate associated with a second artifact owned by the second group of users, where the second group of users includes at least a subset of users from the first group of users, and where the request includes a subset of the first properties for generating in the second electronic digital certificate. The at least one processing device may be configured to: generate the second electronic digital certificate having the subset of the first properties; record, on the distributed ledger, second interests of the second group of users in the second electronic digital certificate; and link, in the distributed ledger, the first interests and the second interests.

In some embodiments, the first properties of the first electronic digital certificate may include a smart contract, where the smart contract includes an assignment of rights to a verified authority of the first electronic digital certificate, where the rights include a right to determine whether to authorize a proposed transfer of ownership of the first electronic digital certificate. Additionally, or alternatively, the smart contract may include a set of rules governing proposed transfers of interest in the first electronic digital certificate. In some embodiments, the subset of the first properties may include the smart contract of the first properties of the first electronic digital certificate. In some embodiments, the second electronic digital certificate has second properties, where the second properties include a smart contract, where the smart contract includes an assignment of rights to a verified authority of the second electronic digital certificate, and where the rights include a right to determine whether to authorize a proposed transfer of interests of the second electronic digital certificate. Additionally, or alternatively, the smart contract may include a set of rules governing proposed transfers of interest in the second electronic digital certificate.

In some embodiments, the distributed ledger may include a compressed chain of ownership of the first electronic digital certificate and another compressed chain of ownership of the second electronic digital certificate. In some embodiments, the at least one processing device may be configured to: provide, to another system associated with an insuring entity, a unique identifier of the second electronic digital certificate; receive, from the other system, information identifying an insurance policy; store, on the distributed ledger, the stored information identifying the insurance policy with the second electronic digital certificate. In some embodiments, the first artifact may include at least one of a first physical artifact or a first digital artifact. In some embodiments, the second artifact may include at least one of a second physical artifact or a second digital artifact.

In some embodiments, the at least one processing device may be configured to provide, to any one of a user from the first group of users, a user from the second group of users, or an additional user, an ownership record for the second electronic digital certificate, based on the distributed ledger. In some embodiments, the ownership record may include at least one selected from the group consisting of: a list of owners of the second electronic digital certificate, a list of shareholders of the second electronic digital certificate, a list of verified authorities of the second electronic digital certificate, a timeline of owners of the second electronic digital certificate, a timeline of shareholders of the second electronic digital certificate, a timeline of verified authorities of the second electronic digital certificate, a list of smart contracts associated with the second electronic digital certificate, a value of each share of the second electronic digital certificate, and combinations thereof.

In yet another aspect, a computer program product for distributing electronic digital certificates is presented. The computer program product may include a non-transitory computer-readable medium comprising code causing a first apparatus to: generate a first electronic digital certificate associated with a first artifact, where the first artifact is owned by a group of users, and where the first electronic digital certificate has first properties; store the first electronic digital certificate on a distributed ledger; and record, on the distributed ledger, first interests of the first group of users in the first electronic digital certificate. The non-transitory computer-readable medium may include code causing a first apparatus to receive, from a second group of users, a request to generate a second electronic digital certificate associated with a second artifact owned by the second group of users, where the second group of users includes at least a subset of users from the first group of users, and where the request includes a subset of the first properties for generating in the second electronic digital certificate. The non-transitory computer-readable medium may include code causing a first apparatus to: generate the second electronic digital certificate having the subset of the first properties; record, on the distributed ledger, second interests of the second group of users in the second electronic digital certificate; and link, in the distributed ledger, the first interests and the second interests.

In some embodiments, the first properties of the first electronic digital certificate include a smart contract, where the smart contract includes an assignment of rights to a verified authority of the first electronic digital certificate, where the rights include a right to determine whether to authorize a proposed transfer of ownership of the first electronic digital certificate. Additionally, or alternatively, the smart contract may include a set of rules governing proposed transfers of interest in the first electronic digital certificate. In some embodiments, the subset of the first properties may include the smart contract of the first properties of the first electronic digital certificate. In some embodiments, the second electronic digital certificate has second properties, where the second properties include a smart contract and where the smart contract includes an assignment of rights to a verified authority of the second electronic digital certificate, where the rights include a right to determine whether to authorize a proposed transfer of interests of the second electronic digital certificate. Additionally, or alternatively, the smart contract may include a set of rules governing proposed transfers of interest in the second electronic digital certificate. In some embodiments, the distributed ledger may include a compressed chain of ownership of the first electronic digital certificate and another compressed chain of ownership of the second electronic digital certificate.

In some embodiments, the non-transitory computer-readable medium may include code causing the first apparatus to: provide, to another system associated with an insuring entity, a unique identifier of the second electronic digital certificate; receive, from the other system, information identifying an insurance policy; and store, on the distributed ledger, the stored information identifying the insurance policy with the second electronic digital certificate. In some embodiments, the first artifact may include at least one of a first physical artifact or a first digital artifact. In some embodiments, the second artifact may include at least one of a second physical artifact or a second digital artifact.

In some embodiments, the non-transitory computer-readable medium may include code causing a first apparatus to provide, to any one of a user from the first group of users, a user from the second group of users, or an additional user, an ownership record for the second electronic digital certificate, based on the distributed ledger. In some embodiments, the ownership record may include a list of owners of the second electronic digital certificate, a list of shareholders of the second electronic digital certificate, a list of verified authorities of the second electronic digital certificate, a timeline of owners of the second electronic digital certificate, a timeline of shareholders of the second electronic digital certificate, a timeline of verified authorities of the second electronic digital certificate, a list of smart contracts associated with the second electronic digital certificate, a value of each share of the second electronic digital certificate, and/or the like.

In yet another aspect, a method for distributing electronic digital certificates is presented. The method may include: generating a first electronic digital certificate associated with a first artifact, where the first artifact is owned by a first group of users and where the first electronic digital certificate has first properties; storing the first electronic digital certificate on a distributed ledger; and recording, on the distributed ledger, first interests of the first group of users in the first electronic digital certificate. The method may include receiving, from a second group of users, a request to generate a second electronic digital certificate associated with a second artifact owned by the second group of users, where the second group of users includes at least a subset of users from the first group of users, and where the request includes a subset of the first properties for generation in the second electronic digital certificate. The method may include: generating the second electronic digital certificate having the subset of the first properties; recording, on the distributed ledger, second interests of the second group of users in the second electronic digital certificate; and linking, in the distributed ledger, the first interests and the second interests.

In some embodiments, the first properties of the first electronic digital certificate include a smart contract, where the smart contract includes an assignment of rights to a verified authority of the first electronic digital certificate, where the rights include a right to determine whether to authorize a proposed transfer of ownership of the first electronic digital certificate. Additionally, or alternatively, the smart contract may include a set of rules governing proposed transfers of interest in the first electronic digital certificate. In some embodiments, the subset of the first properties may include the smart contract of the first properties of the first electronic digital certificate. In some embodiments, the second electronic digital certificate has second properties, where the second properties include a smart contract, where the smart contract includes an assignment of rights to a verified authority of the second electronic digital certificate, and where the rights include a right to determine whether to authorize a proposed transfer of interests of the second electronic digital certificate. Additionally, or alternatively, the smart contract may include a set of rules governing proposed transfers of interest in the second electronic digital certificate.

The features, functions, and advantages that have been discussed may be achieved independently in various embodiments of the present invention or may be combined with yet other embodiments, further details of which may be seen with reference to the following description and drawings.

BRIEF DESCRIPTION OF THE DRAWINGS

Figure 1:
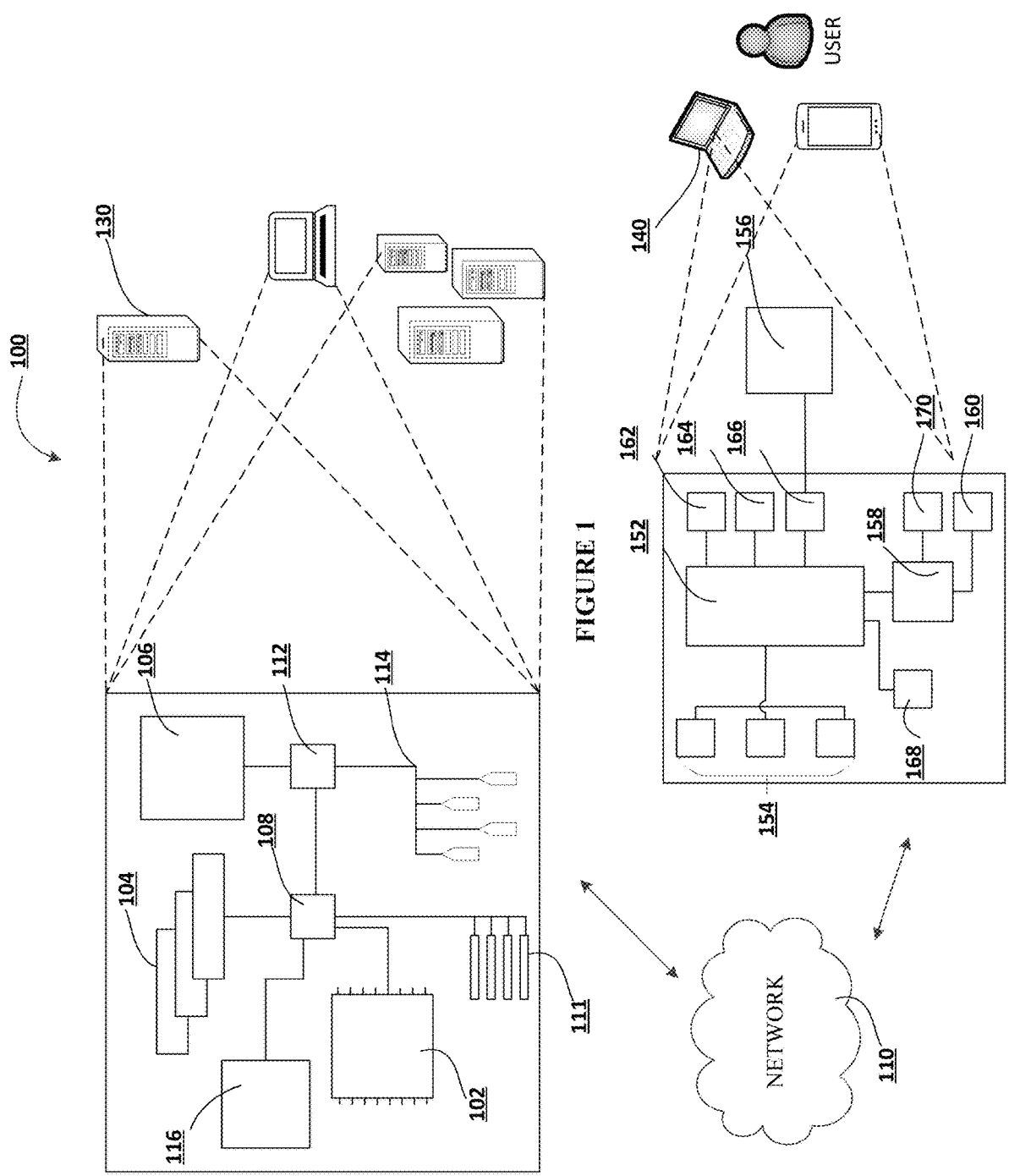
Figure 2:
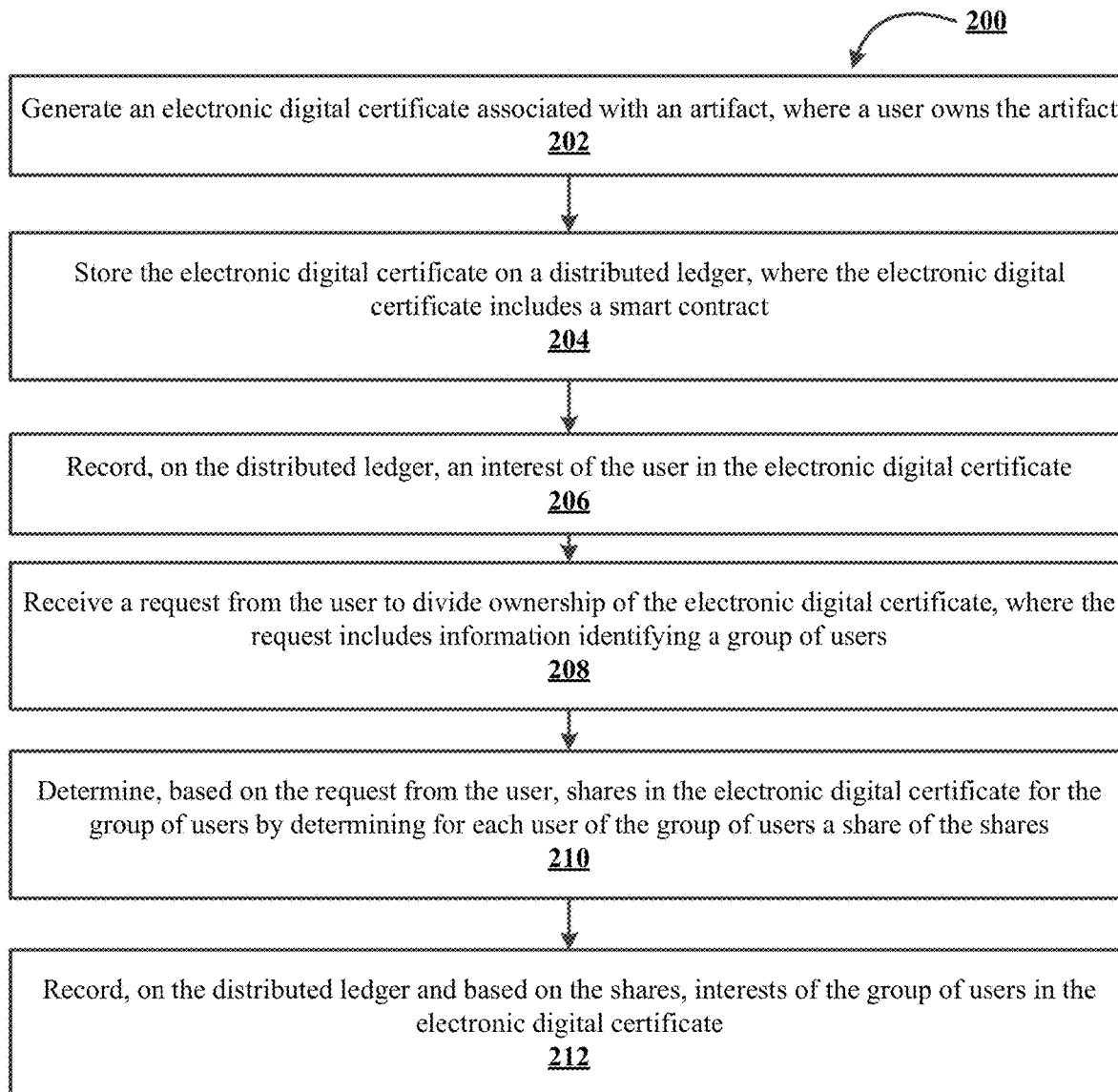
Figure 3:
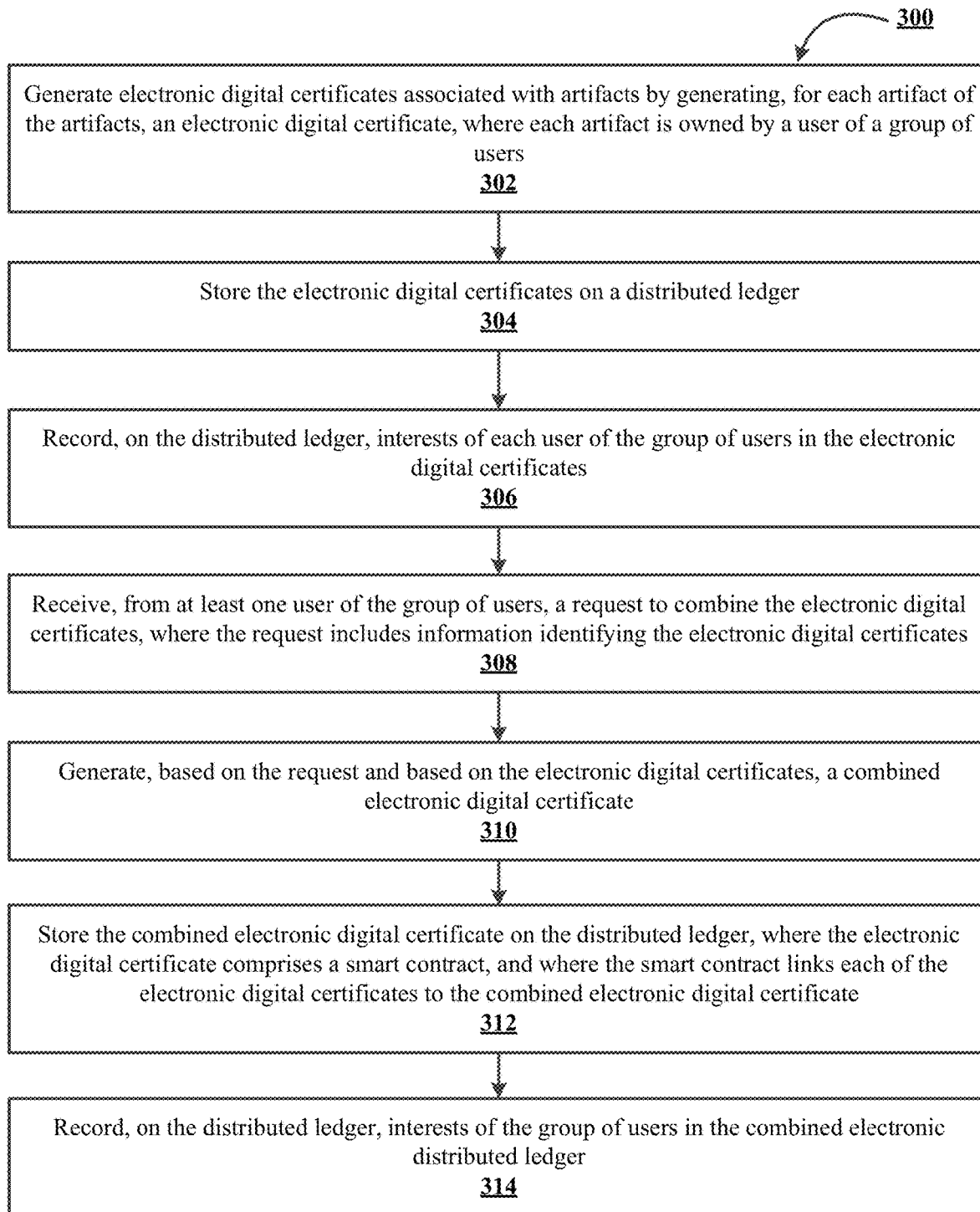
Figure 4:
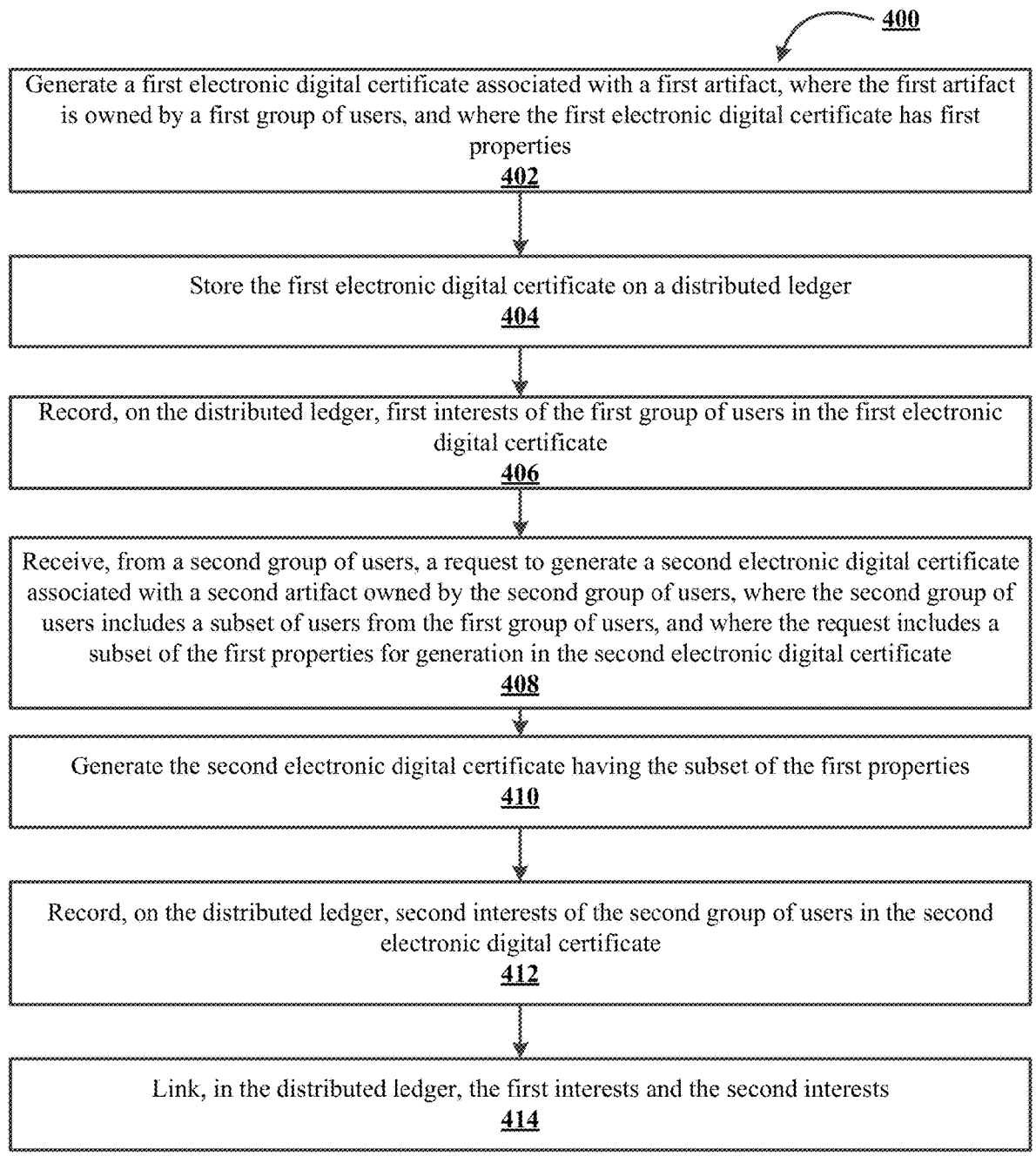
Figure 5:
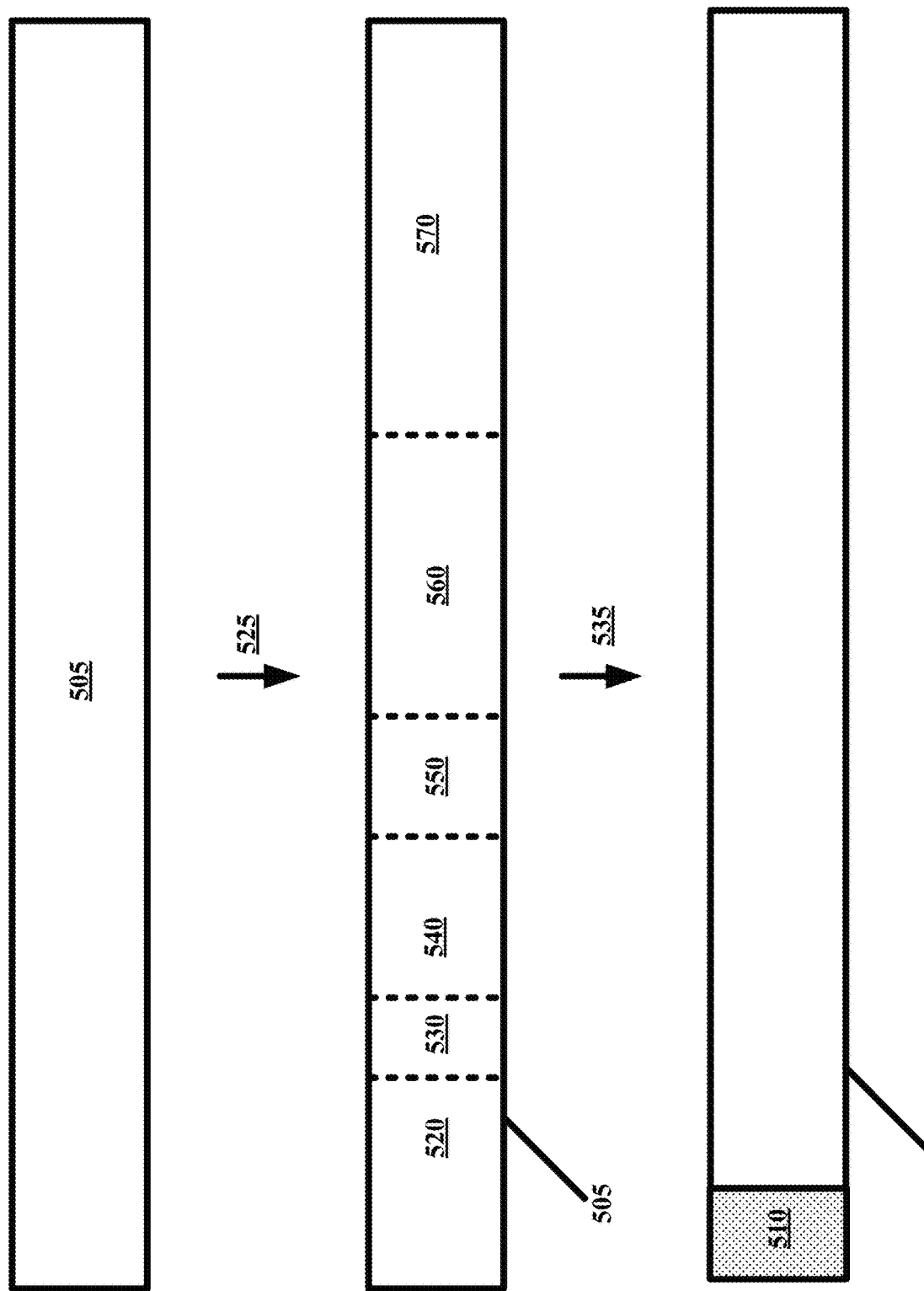
Figure 6:
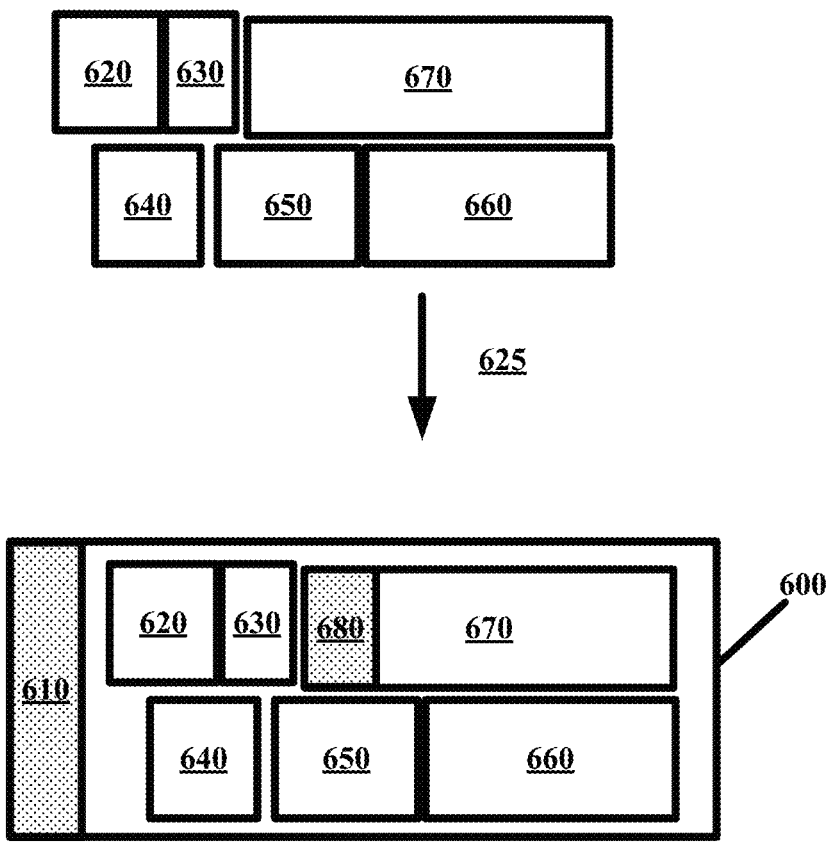
Figure 7:
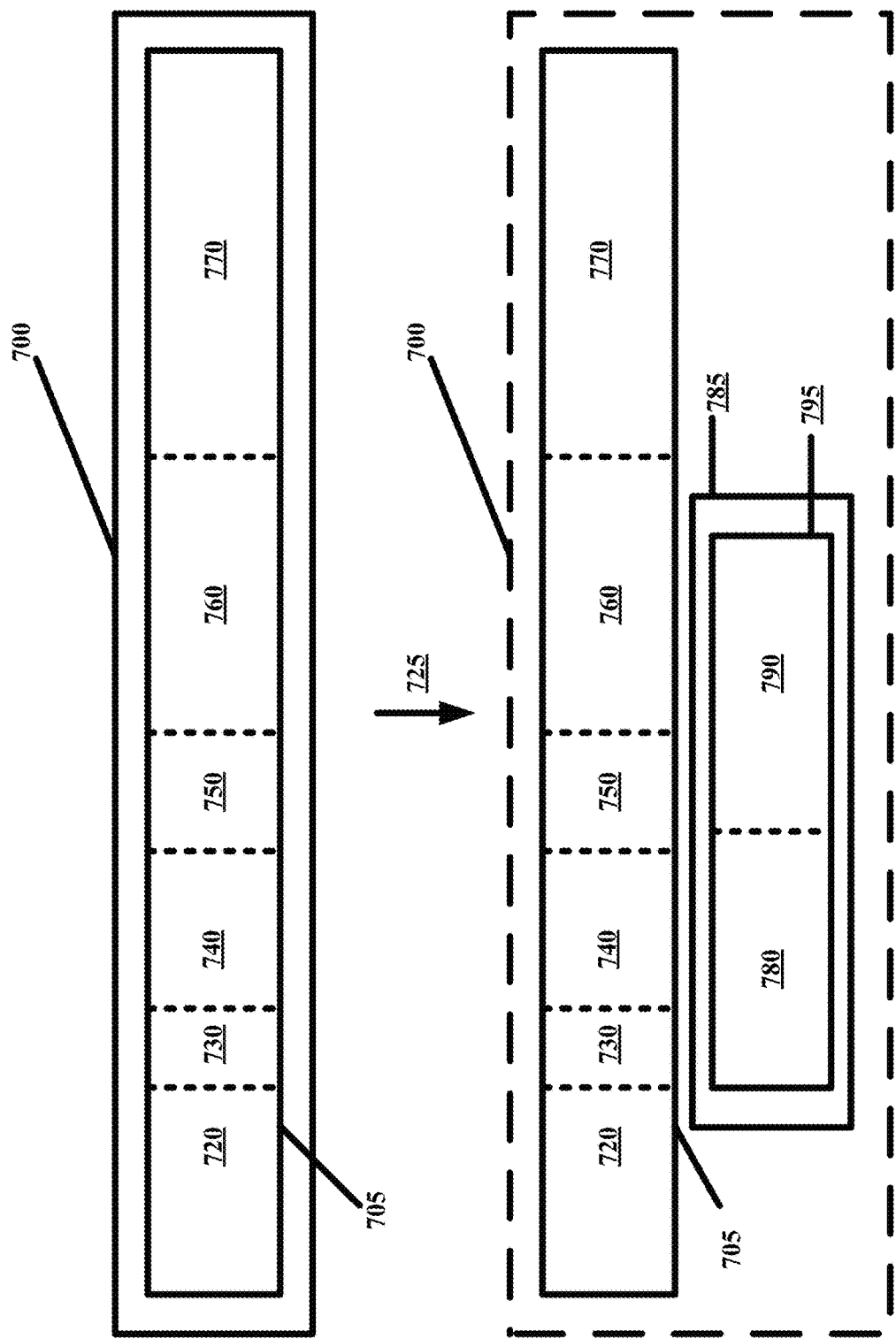

Having thus described embodiments of the invention in general terms, reference will now be made the accompanying drawings, wherein:

FIG. 1 illustrates technical components of a system for the distribution of electronic digital certificates, in accordance with an embodiment of the invention;

FIG. 2 illustrates a process flow for electronic digital certificate ownership division, in accordance with an embodiment of the invention;

FIG. 3 illustrates a process flow for combined electronic digital certificate generation, in accordance with an embodiment of the invention;

FIG. 4 illustrates a process flow for the generation of linked electronic digital certificates, in accordance with an embodiment of the invention;

FIG. 5 illustrates an exemplary schematic for the division of electronic digital certificates, in accordance with an embodiment of the invention;

FIG. 6 illustrates an exemplary schematic for the generation of combined electronic digital certificates, in accordance with an embodiment of the invention; and FIG. 7 illustrates an exemplary schematic for the generation of linked electronic digital certificates, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As noted, the system may be configured to distribute, assign, establish, record, and/or the like ownership of an artifact or a collection of artifacts, via electronic digital certificates. For example, the system may manage ownership of an artifact or resource with respect to inheritance and dependent ownership. The system may create shareholders of a single artifact or resource. The system may provide restrictions to the shareholders and/or owners of the artifact or resource. The system may facilitate the transfer of artifacts and/or shares of an artifact. The system may provide a chain of ownership or title associated with the artifact or resource within the electronic digital certificate. If an artifact or resource is sold, the electronic digital certificate may be reset via compression of the information on the electronic digital certificate to allow for new information associated with a new owner or set of owners to be recorded.

Further, the system may combine several electronic digital certificates associated with resources as part of a collection into a combined electronic digital certificate. Each of the electronic digital certificates may be generated based on an artifact. The combined electronic digital certificate allows for ownership and/or management of the individual electronic digital certificates and/or artifacts associated with the individual electronic digital certificates. The combined electronic digital certificate may be distributed to owners of the individual electronic digital certificates, creating an interrelationship between each electronic digital certificate. The combined electronic digital certificate may allow for recordkeeping, insurance, assignment of a power of attorney, and/or the like. The combined electronic digital certificate may also provide a chain of ownership or title associated with each individual electronic digital certificate and/or artifacts associated with the individual electronic digital certificates. If a collection or resource is sold, the combined electronic digital certificate may be reset via compression of the information on the combined electronic digital certificate to allow for new information associated with a new owner or set of owners.

Additionally, the system may create an electronic digital certificate with information that confirms ownership and percentage of ownership of an artifact or resource. The system may, in the instance where owners of a first electronic digital certificate associated with a first artifact include at least one of the owners of a second artifact, create a second electronic digital certificate associated with the second artifact, where the second electronic digital certificate includes a portion of the information and/or properties of the first electronic digital certificate.

Some embodiments described herein provide a system, a computer program product, and/or a method for generating an electronic digital certificate (e.g., a non-fungible token and/or the like) associated with an artifact and recording, as part of the electronic digital certificate, interests in shares of the artifact. For example, a system may be configured to generate an electronic digital certificate, record the electronic digital certificate on a distributed ledger, determine shares in the electronic digital certificate for a group of users, and record, on the distributed ledger interests of the group of users in the electronic digital certificate.

For example, the system may generate an electronic digital certificate for a family heirloom. The owner of the family heirloom may wish to pass the heirloom down to multiple heirs. The system may receive a request from the owner to divide ownership amongst the heirs. The system may determine shares in the electronic digital certificate for the heirs and record on a distributed ledger interests of the group of users in the electronic digital certificate and the heirloom. As another example, if the heirs who collectively own the heirloom wish to transfer ownership of the heirloom to an individual, the system may compress the recorded interests of the group of heirs, store the compressed recorded interests on the distributed ledger, and record the new interests of the new individual. The system may also associate the electronic digital certificate with an insurance policy.

Some embodiments described herein provide a system, a computer program product, and/or a method for generating multiple electronic digital certificates each associated with an artifact from a collection of artifacts and further generating a combined electronic digital certificate for the collection of artifacts. For example, a system may be configured to generate electronic digital certificates associated with artifacts by generating an electronic digital certificate for each artifact, store the electronic digital certificates on a distributed ledger, record interests of owners on the distributed ledger, receive a request from an owner to combine the electronic digital certificates, generate a combined electronic digital certificate, and store the combined electronic digital certificate on the distributed ledger. The combined electronic digital certificate may include a smart contract. The smart contract may provide for a verified authority, or power of attorney, of the combined electronic digital certificate. The system may, after receiving a request to transfer ownership of the combined electronic digital certificate, compress the recorded interests of the group of users, store the compressed interests on the distributed ledger, and record the interests of the new user in the combined electronic digital certificate. The system may also associate the combined electronic digital certificate with an insurance policy.

As an example, a group of owners who own individual electronic digital certificates associated with art pieces, may wish to associate the electronic digital certificates together within a single collection. The system may create a combined electronic digital certificate representing the interests of each individual owner in the combined electronic digital certificate. The combined electronic digital certificate may include a smart contract. The smart contract may provide a verified authority, or power of attorney, for the combined electronic digital certificate.

Some embodiments described herein provide a system, a computer program product, and/or a method for generating an electronic digital certificate associated with an artifact owned by a group of owners, generating a second electronic digital certificate for a second artifact owned by a second group of owners, where the second group has at least one member of the first group of owners, and providing the second electronic digital certificate with some of the same properties of the first electronic digital certificate. For example, a group of owners own an electronic digital certificate associated with an artifact. The group of owners wish to own a second electronic digital certificate associated with a second artifact, and they wish the electronic digital certificate to have the same properties, such as power of attorney, insurance, percentage of ownership, and/or the like. The system may generate the second electronic digital certificate having the properties of the first digital electronic certificate.

As used herein, an "entity" may be any institution employing information technology resources and particularly technology infrastructure configured for processing large amounts of data. Typically, the data may be related to products, services, and/or the like offered and/or provided by the entity, customers of the entity, other aspect of the operations of the entity, people who work for the entity, and/or the like. As such, the entity may be an institution, group, association, financial institution, establishment, company, union, authority, merchant, service provider, and/or the like employing information technology resources for processing large amounts of data. In some embodiments, the entity may be an institution, group, association, financial institution, establishment, company, union, authority, merchant, service provider, and/or the like hosting, sponsoring, coordinating, creating, and/or the like events, recognitions, achievements, and/or the like.

As used herein, a "user" may be an individual associated with an entity. As such, in some embodiments, the user may be an individual having past relationships, current relationships or potential future relationships with an entity. In some embodiments, a "user" may be an employee (e.g., an associate, a project manager, a manager, an administrator, an internal operations analyst, and/or the like) of the entity and/or enterprises affiliated with the entity, capable of operating systems described herein. In some embodiments, a "user" may be any individual, another entity, and/or a system who has a relationship with the entity, such as a customer, a prospective customer, and/or the like. In some embodiments, a user may be a system performing one or more tasks described herein. In some embodiments, a user may be a verified authority as described herein.

As used herein, a "user interface" may be any device or software that allows a user to input information, such as commands and/or data, into a device, and/or that allows the device to output information to the user. For example, a user interface may include an application programmer interface (API), a graphical user interface (GUI), and/or an interface to input computer-executable instructions that direct a processing device to carry out functions. The user interface may employ input and/or output devices to input data received from a user and/or output data to a user. Input devices and/or output devices may include a display, API, mouse, keyboard, button, touchpad, touch screen, microphone, speaker, LED, light, joystick, switch, buzzer, bell, and/or other devices for communicating with one or more users.

As used herein, a "resource" may generally refer to objects, products, devices, goods, commodities, services, offers, discounts, currency, cash, cash equivalents, rewards, reward points, benefit rewards, bonus miles, cash back, credits, and/or the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, and/or the like.

As used herein, a "source retainer" may generally refer to an account, a system, and/or the like associated with a user and/or a type of resources, such as software, a checking account, a deposit account, a savings account, a credit account, a rewards account, a rewards points account, a benefit rewards account, a bonus miles account, a cash back account, and/or the like, which may be managed and/or maintained by an entity, such as a financial institution, an electronic resource transfer institution (e.g., a credit card company, a debit card company, a prepaid card company, and/or the like), a credit union, and/or the like.

As used herein, a "distribution" and/or an "allocation" may refer to any transaction, activities, and/or communication between one or more entities, between a user and one or more entities, and/or the like. A resource distribution and/or an allocation of resources may refer to any distribution of resources such as, but not limited to, a payment, processing of funds, purchase of goods or services, a return of goods or services, a payment transaction, a credit transaction, other interactions involving a user's resource or account, and/or the like. In the context of an entity such as a financial institution, a resource distribution and/or an allocation of resources may refer to one or more of a sale of goods and/or services, initiating an automated teller machine (ATM) or online financial session, an account balance inquiry, a rewards transfer, an account money transfer or withdrawal, opening a financial application on a user's computer or mobile device, a user accessing their e-wallet, any other interaction involving the user and/or the user's device that invokes and/or is detectable by the financial institution, and/or the like. In some embodiments, the user may authorize a resource distribution and/or an allocation of resources using a resource distribution instrument (e.g., credit cards, debit cards, checks, digital wallets, currency, loyalty points, and/or the like) and/or resource distribution credentials (e.g., account numbers, resource distribution instrument identifiers, and/or the like). A resource distribution and/or an allocation of resources may include one or more of the following: renting, selling, and/or leasing goods and/or services (e.g., groceries, stamps, tickets, DVDs, vending machine items, and/or the like); making payments to creditors (e.g., paying monthly bills; paying federal, state, and/or local taxes; and/or the like); sending remittances; loading money onto stored value cards (SVCs) and/or prepaid cards; donating to charities; and/or the like. Unless specifically limited by the context, a "resource distribution," an "allocation of resources," a "resource transfer," a "transaction," a "transaction event," and/or a "point of transaction event" may refer to any activity between a user, a merchant, an entity, and/or the like. In some embodiments, a resource distribution and/or an allocation of resources may refer to financial transactions involving direct or indirect movement of funds through traditional paper transaction processing systems (e.g., paper check processing) or through electronic transaction processing systems. In this regard, resource distributions and/or allocations of resources may refer to the user initiating a purchase for a product, service, or the like from a merchant. Typical financial resource distribution and/or financial allocations of resources include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points, and/or the like. When describing that resource transfers or transactions are evaluated, such descriptions may mean that the transaction has already occurred, is in the process of occurring or being processed, or has yet to be processed/posted by one or more financial institutions.

As used herein, "resource distribution instrument" may refer to an electronic payment vehicle, such as an electronic credit, debit card, and/or the like, associated with a source retainer (e.g., a checking account, a deposit account, a savings account, a credit account, and/or the like). In some embodiments, the resource distribution instrument may not be a "card" and may instead be account identifying information stored electronically in a user device, such as payment credentials and/or tokens and/or aliases associated with a digital wallet, account identifiers stored by a mobile application, and/or the like.

In some embodiments, the term "module" with respect to an apparatus may refer to a hardware component of the apparatus, a software component of the apparatus, and/or a component of the apparatus that includes both hardware and software. In some embodiments, the term "chip" may refer to an integrated circuit, a microprocessor, a system-on-a-chip, a microcontroller, and/or the like that may either be integrated into the external apparatus, may be inserted and/or removed from the external apparatus by a user, and/or the like.

As used herein, an "engine" may refer to core elements of a computer program, part of a computer program that serves as a foundation for a larger piece of software and drives the functionality of the software, and/or the like. An engine may be self-contained but may include externally controllable code that encapsulates powerful logic designed to perform or execute a specific type of function. In one aspect, an engine may be underlying source code that establishes file hierarchy, input and/or output methods, how a part of a computer program interacts and/or communicates with other software and/or hardware, and/or the like. The components of an engine may vary based on the needs of the computer program as part of the larger piece of software. In some embodiments, an engine may be configured to retrieve resources created in other computer programs, which may then be ported into the engine for use during specific operational aspects of the engine. An engine may be configurable to be implemented within any general-purpose computing system. In doing so, the engine may be configured to execute source code embedded therein to control specific features of the general-purpose computing system to execute specific computing operations, thereby transforming the general-purpose system into a specific purpose computing system.

As used herein, a "component" of an application may include a software package, a service, a resource, a module, and/or the like that includes a set of related functions and/or data. In some embodiments, a component may provide a source capability (e.g., a function, a business function, and/or the like) to an application including the component. In some embodiments, components of an application may communicate with each other via interfaces and may provide information to each other indicative of the services and/or functions that other components may utilize and/or how other components may utilize the services and/or functions. Additionally, or alternatively, components of an application may be substitutable such that a component may replace another component. In some embodiments, components may include objects, collections of objects, and/or the like.

As used herein, "authentication credentials" may be any information that may be used to identify a user. For example, a system may prompt a user to enter authentication information such as a username, a password, a token, a personal identification number (PIN), a passcode, biometric information (e.g., voice authentication, a fingerprint, and/or a retina scan), an answer to a security question, a unique intrinsic user activity, such as making a predefined motion with a user device, and/or the like. The authentication information may be used to authenticate the identity of the user (e.g., determine that the authentication information is associated with an account) and/or determine that the user has authority to access an account or system. In some embodiments, the system may be owned and/or operated by an entity. In such embodiments, the entity may employ additional computer systems, such as authentication servers, to validate and certify resources inputted by a plurality of users within the system. The system may further use authentication servers to certify the identity of users of the system, such that other users may verify the identity of the certified users. In some embodiments, the entity may certify the identity of the users. Furthermore, authentication information and/or permission may be assigned to and/or required from a user, application, computing node, computing cluster, and/or the like to access stored data within at least a portion of the system.

As used herein, an "interaction" may refer to any communication between one or more users, one or more entities or institutions, and/or one or more devices, nodes, clusters, and/or systems within the system environment described herein. For example, an interaction may refer to a transfer of data between devices, an accessing of stored data by one or more nodes of a computing cluster, a transmission of a requested task, and/or the like. In some embodiments, an interaction may refer to an entity, a user, a system, and/or a device providing an advertisement, information, data, a user interface, and/or the like to another entity, another user, another system, and/or another device.

As used herein, an "electronic digital certificate" may refer to any electronic and/or digital documentation of ownership, which may include, but is not limited to, non-fungible tokens (NFTs). NFTs may be blockchain supported units of data containing information related to ownership.

As used herein, a "distributed ledger" may refer to any digital ledger technology, which may include, but is not limited to, blockchain-based digital rights management platforms. A distributed ledger may refer to any website, application, network, or any other electronic form of storing and/or processing digital rights, such as NFTs. In some embodiments, the distributed ledger may be any platform that stores and manages the rights to NFTs. Additionally, or alternatively, the distributed ledger may be a blockchain-based digital rights management platform owned, operated, maintained, and/or the like by an entity, such as a financial institution, for permitting users to receive, manage, display, and/or the like NFTs or electronic digital certificates, offer the NFTs or electronic digital certificates to other users, use the NFTs, and/or the like.

As used herein, identifiers such as "first," "second," "third," and/or the like do not indicate a temporal relationship, unless explicitly stated. Such identifiers may modify instances of similar things and may be used to differentiate between each of the instances.

As used herein, a "subset" may refer to one or more from a group. For example, a subset of users from a group of users may be one user from the group of users, multiple users from the group of users, or all of the users from the group of users. As another example, a subset of properties may be one property from the properties, multiple properties from the properties, or all of the properties.

FIG. 1 presents an exemplary block diagram of a system environment 100 for generating and managing electronic digital certificates, in accordance with an embodiment of the invention. FIG. 1 provides a system environment 100 that includes specialized servers and a system communicably linked across a distributive network of nodes required to perform functions of process flows described herein in accordance with embodiments of the present invention.

As illustrated, the system environment 100 includes a network 110, a system 130, and a user input system 140. Also shown in FIG. 1 is a user of the user input system 140. The user input system 140 may be a mobile device, a non-mobile computing device, and/or the like. The user may be a person who uses the user input system 140 to access, view modify, interact with, and/or the like information, data, images, video, and/or the like. The user may be a person who uses the user input system 140 to initiate, perform, monitor, and/or the like changes and/or modifications to one or more systems, applications, services, and/or the like. The one or more systems, applications, services, and/or the like may be configured to communicate with the system 130, input information onto a user interface presented on the user input system 140, and/or the like. The applications stored on the user input system 140 and the system 130 may incorporate one or more parts of any process flow described herein.

As shown in FIG. 1, the system 130 and the user input system 140 are each operatively and selectively connected to the network 110, which may include one or more separate networks. In some embodiments, the network 110 may include a telecommunication network, local area network (LAN), a wide area network (WAN), and/or a global area network (GAN), such as the Internet. Additionally, or alternatively, the network 110 may be secure and/or unsecure and may also include wireless and/or wired and/or optical interconnection technology.

In some embodiments, the system 130 and the user input system 140 may be used to implement processes described herein, including user-side and server-side processes generating limited-transferability electronic digital certificates associated with events, in accordance with an embodiment of the present invention. The system 130 may represent various forms of digital computers, such as laptops, desktops, workstations, personal digital assistants, servers, blade servers, mainframes, and/or the like. The user input system 140 may represent various forms of mobile devices, such as personal digital assistants, cellular telephones, smartphones, smart glasses, and/or the like. The components shown here, their connections, their relationships, and/or their functions, are meant to be exemplary only, and are not meant to limit implementations of the inventions described and/or claimed in this document.

In some embodiments, the system 130 may include a processor 102, memory 104, a storage device 106, a high-speed interface 108 connecting to memory 104, high-speed expansion ports 111, and a low-speed interface 112 connecting to low-speed bus 114 and storage device 106. Each of the components 102, 104, 106, 108, 111, and 112 may be interconnected using various buses, and may be mounted on a common motherboard or in other manners as appropriate. The processor 102 may process instructions for execution within the system 130, including instructions stored in the memory 104 and/or on the storage device 106 to display graphical information for a GUI on an external input/output device, such as a display 116 coupled to a high-speed interface 108. In some embodiments, multiple processors, multiple buses, multiple memories, multiple types of memory, and/or the like may be used. Also, multiple systems, same or similar to system 130 may be connected, with each system providing portions of the necessary operations (e.g., as a server bank, a group of blade servers, a multi-processor system, and/or the like). In some embodiments, the system 130 may be managed by an entity, such as a business, a merchant, a financial institution, a card management institution, a software and/or hardware development company, a software and/or hardware testing company, and/or the like. The system 130 may be located at a facility associated with the entity and/or remotely from the facility associated with the entity.

The memory 104 may store information within the system 130. In one implementation, the memory 104 may be a volatile memory unit or units, such as volatile random-access memory (RAM) having a cache area for the temporary storage of information. In another implementation, the memory 104 may be a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 may be capable of providing mass storage for the system 130. In one aspect, the storage device 106 may be or contain a computer-readable medium, such as a floppy disk device, a hard disk device, an optical disk device, a tape device, a flash memory and/or other similar solid state memory device, and/or an array of devices, including devices in a storage area network or other configurations. A computer program product may be tangibly embodied in an information carrier. The computer program product may also contain instructions that, when executed, perform one or more methods, such as those described herein. The information carrier may be a non-transitory computer-readable or machine-readable storage medium, such as the memory 104, the storage device 106, and/or memory on processor 102.

In some embodiments, the system 130 may be configured to access, via the network 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel and/or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, the memory may appear to be allocated from a central pool of memory, even though the memory space may be distributed throughout the system. Such a method of dynamically allocating memory provides increased flexibility when the data size changes during the lifetime of an application and allows memory reuse for better utilization of the memory resources when the data sizes are large.

The high-speed interface 108 may manage bandwidth-intensive operations for the system 130, while the low-speed interface 112 and/or controller manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In some embodiments, low-speed interface 112 and/or controller is coupled to storage device 106 and low-speed bus 114 (e.g., expansion port). The low-speed bus 114, which may include various communication ports (e.g., USB, Bluetooth, Ethernet, wireless Ethernet), may be coupled to one or more input/output devices, such as a keyboard, a pointing device, a scanner, and/or a networking device such as a switch or router (e.g., through a network adapter).

The system 130 may be implemented in a number of different forms, as shown in FIG. 1. For example, it may be implemented as a standard server or multiple times in a group of such servers. Additionally, or alternatively, the system 130 may be implemented as part of a rack server system, a personal computer, such as a laptop computer, and/or the like. Alternatively, components from system 130 may be combined with one or more other same or similar systems and the user input system 140 may be made up of multiple computing devices communicating with each other.

FIG. 1 also illustrates a user input system 140, in accordance with an embodiment of the invention. The user input system 140 may include a processor 152, memory 154, an input/output device such as a display 156, a communication interface 158, and a transceiver 160, among other components, such as one or more image sensors. The user input system 140 may also be provided with a storage device, such as a microdrive and/or the like, to provide additional storage. Each of the components 152, 154, 158, and 160, may be interconnected using various buses, and several of the components may be mounted on a common motherboard or in other manners as appropriate.

The processor 152 may be configured to execute instructions within the user input system 140, including instructions stored in the memory 154. The processor 152 may be implemented as a chipset of chips that include separate and multiple analog and/or digital processors. The processor 152 may be configured to provide, for example, for coordination of the other components of the user input system 140, such as control of user interfaces, applications run by user input system 140, and/or wireless communication by user input system 140.

The processor 152 may be configured to communicate with the user through control interface 164 and display interface 166 coupled to a display 156. The display 156 may be, for example, a Thin-Film-Transistor Liquid Crystal Display (TFT LCD) or an Organic Light Emitting Diode (OLED) display, and/or other appropriate display technology. An interface of the display 156 may include appropriate circuitry and may be configured for driving the display 156 to present graphical and other information to a user. The control interface 164 may receive commands from a user and convert them for submission to the processor 152. In addition, an external interface 168 may be provided in communication with processor 152 to enable near area communication of user input system 140 with other devices. External interface 168 may provide, for example, for wired communication in some implementations, or for wireless communication in other implementations, and multiple interfaces may also be used.

The memory 154 may store information within the user input system 140. The memory 154 may be implemented as one or more of a computer-readable medium or media, a volatile memory unit or units, or a non-volatile memory unit or units. Expansion memory may also be provided and connected to user input system 140 through an expansion interface (not shown), which may include, for example, a Single In Line Memory Module (SIMM) card interface. Such expansion memory may provide extra storage space for user input system 140 and/or may store applications and/or other information therein. In some embodiments, expansion memory may include instructions to carry out or supplement the processes described above and/or may include secure information. For example, expansion memory may be provided as a security module for user input system 140 and may be programmed with instructions that permit secure use of user input system 140. Additionally, or alternatively, secure applications may be provided via the SIMM cards, along with additional information, such as placing identifying information on the SIMM card in a secure manner. In some embodiments, the user may use applications to execute processes described with respect to the process flows described herein. For example, one or more applications may execute the process flows described herein. In some embodiments, one or more applications stored in the system 130 and/or the user input system 140 may interact with one another and may be configured to implement any one or more portions of the various user interfaces and/or process flow described herein.

The memory 154 may include, for example, flash memory and/or NVRAM memory. In some embodiments, a computer program product may be tangibly embodied in an information carrier. The computer program product may contain instructions that, when executed, perform one or more methods, such as those described herein. The information carrier may be a computer-readable or machine-readable medium, such as the memory 154, expansion memory, memory on processor 152, and/or a propagated signal that may be received, for example, over transceiver 160 and/or external interface 168.

In some embodiments, the user may use the user input system 140 to transmit and/or receive information and/or commands to and/or from the system 130. In this regard, the system 130 may be configured to establish a communication link with the user input system 140, whereby the communication link establishes a data channel (wired and/or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, and/or the like.

The user input system 140 may communicate with the system 130 (and one or more other devices) wirelessly through communication interface 158, which may include digital signal processing circuitry. Communication interface 158 may provide for communications under various modes or protocols, such as GSM voice calls, SMS, EMS, or MMS messaging, CDMA, TDMA, PDC, WCDMA, CDMA2000, GPRS, and/or the like. Such communication may occur, for example, through transceiver 160. Additionally, or alternatively, short-range communication may occur, such as using a Bluetooth, Wi-Fi, and/or other such transceiver (not shown). Additionally, or alternatively, a Global Positioning System (GPS) receiver module 170 may provide additional navigation-related and/or location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker (e.g., in a handset) of user input system 140. Such sound may include sound from voice telephone calls, may include recorded sound (e.g., voice messages, music files, and/or the like) and may also include sound generated by one or more applications operating on the user input system 140, and in some embodiments, one or more applications operating on the system 130.

Various implementations of the systems and techniques described here may be realized in digital electronic circuitry, integrated circuitry, specially designed ASICs (application specific integrated circuits), computer hardware, firmware, software, and/or combinations thereof. Such various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and/or at least one output device.

Computer programs (e.g., also referred to as programs, software, applications, code, and/or the like) may include machine instructions for a programmable processor, and may be implemented in a high-level procedural and/or object-oriented programming language, and/or in assembly/machine language. As used herein, the terms "machine-readable medium" and/or "computer-readable medium" may refer to any computer program product, apparatus and/or device (e.g., magnetic discs, optical disks, memory, Programmable Logic Devices (PLDs), and/or the like) used to provide machine instructions and/or data to a programmable processor, including a machine-readable medium that receives machine instructions as a machine-readable signal. The term "machine-readable signal" may refer to any signal used to provide machine instructions and/or data to a programmable processor.

To provide for interaction with a user, the systems and/or techniques described herein may be implemented on a computer having a display device (e.g., a CRT (cathode ray tube), an LCD (liquid crystal display) monitor, and/or the like) for displaying information to the user, a keyboard by which the user may provide input to the computer, and/or a pointing device (e.g., a mouse or a trackball) by which the user may provide input to the computer. Other kinds of devices may be used to provide for interaction with a user as well. For example, feedback provided to the user may be any form of sensory feedback (e.g., visual feedback, auditory feedback, and/or tactile feedback). Additionally, or alternatively, input from the user may be received in any form, including acoustic, speech, and/or tactile input.

The systems and techniques described herein may be implemented in a computing system that includes a back end component (e.g., as a data server), that includes a middleware component (e.g., an application server), that includes a front end component (e.g., a client computer having a graphical user interface or a Web browser through which a user may interact with an implementation of the systems and techniques described here), and/or any combination of such back end, middleware, and/or front end components. Components of the system may be interconnected by any form or medium of digital data communication (e.g., a communication network). Examples of communication networks include a local area network ("LAN"), a wide area network ("WAN"), and/or the Internet.

In some embodiments, computing systems may include clients and servers. A client and server may generally be remote from each other and typically interact through a communication network. The relationship of client and server may arise by virtue of computer programs running on the respective computers and having a client-server relationship to each other.

The embodiment of the system environment 100 illustrated in FIG. 1 is exemplary and other embodiments may vary. As another example, in some embodiments, the system 130 includes more, less, or different components. As another example, in some embodiments, some or all of the portions of the system environment 100, the system 130, and/or the user input system 140 may be combined into a single portion. Likewise, in some embodiments, some or all of the portions of the system environment 100, the system 130, and/or the user input system 140 may be separated into two or more distinct portions.

In some embodiments, the system environment may 100 include one or more user input systems and/or one or more electronic digital certificate generating systems (e.g., similar to the system 130 and/or the user input system 140) associated with an entity (e.g., a business, a merchant, a financial institution, a card management institution, an software and/or hardware development company, a software and/or hardware testing company, and/or the like). For example, a user (e.g., an employee, a customer, and/or the like) may use a user input system (e.g., similar to the user input system 140) to initiate generation of one or more electronic digital certificates associated with one or more artifacts, collections, groups of artifacts, and/or the like using one or more systems, applications, services, and/or the like (e.g., similar to the system 130, running a system similar to the system 130, and/or the like) and the user input system may provide information (e.g., event information, user information, and/or the like) to an electronic digital certificate generating system (e.g., similar to the system 130, running a system similar to the system 130, and/or the like). In some embodiments, the user input system and/or the electronic digital certificate generating system associated with the entity may perform one or more of the steps described herein with respect to the process flows described herein with respect to FIGS. 2, 3, and/or 4.

FIG. 2 illustrates a process flow 200 for electronic digital certificate ownership division, in accordance with an embodiment of the invention. In some embodiments, the electronic digital certificate generating system and/or the like (e.g. similar to one or more of the systems described herein with respect to FIG. 1) may perform one or more of the steps of process flow 200.

As shown in block 202, the process flow 200 may include generating an electronic digital certificate associated with an artifact. For example, an electronic digital certificate generating system may generate an electronic digital certificate based on receiving information from a user associated with the artifact (e.g., a user that owns the artifact, a user that maintains the artifact, and/or the like). In some embodiments, the artifact may be a physical artifact such as an art piece, a vehicle, real estate, and/or the like. Additionally, or alternatively, the artifact may be a digital artifact such as software, a digital image, a digital sound file, a video, and/or the like.

As shown in block 204, the process flow 200 may include storing the electronic digital certificate on a distributed ledger, where the electronic digital certificate includes a smart contract. In some embodiments, the smart contract may include an assignment of rights to a verified authority. For example, the rights may include a right to determine whether to authorize a proposed transfer of ownership of the electronic digital certificate. In some embodiments the smart contract may include a set of rules governing proposed transfers of the electronic digital certificate, proposed transfers of the shares of the electronic digital certificate, and/or the like.

As shown in block 206, the process flow 200 may include recording, on the distributed ledger, an interest of the user in the electronic digital certificate. For example, an electronic digital certificate generating system may record, on the distributed ledger, an interest of the user in the electronic digital certificate.

As shown in block 208, the process flow 200 may include receiving a request from the user to divide ownership of the electronic digital certificate, where the request includes information identifying a group of users. For example, the request may include information identifying each user of the group of users, shares assigned to each user of the group of users, and/or information identifying a verified authority of the electronic digital certificate.

As shown in block 210, the process flow 200 may include determining, based on the request from the user, shares in the electronic digital certificate for the group of users by determining for each user of the group of users a share of the shares. In some embodiments each share, of the shares, may not be equal to another share, of the shares.

As shown in block 212, the process flow 200 may include recording, on the distributed ledger and based on the shares, interests of the group of users in the electronic digital certificate. In some embodiments the process flow 200 may include providing unique identifier information of the electronic digital certificate to another system, receiving, from the other system, information identifying an insurance policy, storing, on the distributed ledger, the information identifying the insurance policy, and associating, on the distributed ledger, the stored information identifying the insurance policy with the electronic digital certificate. Additionally, or alternatively, the process flow 200 may include receiving, from the group of users, another request to transfer ownership to another user, compressing the recorded interests of the group of users, storing the compressed recorded interests on the distributed ledger, and recording, on the distributed ledger and based on the request, another interest of the other user. In some embodiments, the process flow 200 may include, when compressing the recorded interests of the group of users, merging the shares in the electronic digital certificate. Additionally, or alternatively, the distributed ledger may include a compressed chain of ownership of the electronic digital certificate. In some embodiments, the compressed chain of ownership makes up 1% of the electronic digital certificate.

Process flow 200 may include additional embodiments, such as any single embodiment or any combination of embodiments described below and/or in connection with one or more other processes described elsewhere herein.

In a first embodiment, the smart contract may include an assignment of rights to a verified authority of the electronic digital certificate, where the rights include a right to determine whether to authorize a proposed transfer of ownership of the electronic digital certificate and/or a set of rules governing proposed transfers of the electronic digital certificate and the shares of the electronic digital certificate.

In a second embodiment alone or in combination with the first embodiment, each share, of the shares, may not be equal to another share, of the shares.

In a third embodiment alone or in combination with any of the first through second embodiments, the process flow 200 may include receiving, from the group of users, another request to transfer ownership to another user, compressing the recorded interests of the group of users, storing the compressed recorded interests on the distributed ledger, and recording, on the distributed ledger and based on the other request, another interest of other user. The other request from the group of users may include information identifying the other user, and/or shares assigned to the other user. In some embodiments, compressing the recorded ownership interests may include removing redundant information, removing unnecessary information, and/or the like. For example, compressing the recorded ownership interests may include removing metadata associated with the recorded ownership interests. In some embodiments, the recorded interests are compressed by 99%. In some embodiments, the compressed recorded interests make up 1% of the electronic digital certificate.

In a fourth embodiment alone or in combination with any of the first through third embodiments, the process flow 200 may include, when compressing the recorded interests of the group of users, merging the shares in the electronic digital certificate.

In a fifth embodiment alone or in combination with any of the first through fourth embodiments, the distributed ledger may include a compressed chain of ownership of the electronic digital certificate. In some embodiments, the compressed chain of ownership makes up 1% of the electronic digital certificate.

In a sixth embodiment alone or in combination with any of the first through fifth embodiments, the process flow 200 may include providing, to another system associated with an insuring entity, a unique identifier of the electronic digital certificate, receiving, from the other system, information identifying an insurance policy, storing, on the distributed ledger, the information identifying the insurance policy, and associating, on the distributed ledger, the stored information identifying the insurance policy with the electronic digital certificate.

In a seventh embodiment alone or in combination with any of the first through sixth embodiments, the artifact may include a physical artifact, a digital artifact, and/or the like.

Although FIG. 2 shows example blocks of process flow 200, in some embodiments, process flow 200 may include additional blocks, fewer blocks, different blocks, or differently arranged blocks than those depicted in FIG. 2. Additionally, or alternatively, two or more of the blocks of process flow 200 may be performed in parallel.

FIG. 3 illustrates a process flow 300 for combined electronic digital certificate generation, in accordance with an embodiment of the invention. In some embodiments, the electronic digital certificate generating system and/or the like (e.g., similar to one or more of the systems described herein with respect to FIG. 1) may perform one or more of the steps of process flow 300.

As shown in block 302, the process flow 300 may include generating electronic digital certificates associated with artifacts by generating, for each artifact of the artifacts, an electronic digital certificate, where each artifact is owned by a user of a group of users. For example, an electronic digital certificate generating system may generate an electronic digital certificate based on receiving information from the user who owns the artifact. In some embodiments, the artifact may be a physical artifact such as an art piece, a vehicle, real estate, and/or the like. Additionally, or alternatively, the artifact may be a digital artifact such as software, a digital image, a digital sound file, a video, and/or the like.

As shown in block 304 the process flow 300 may include storing the electronic digital certificate on a distributed ledger. For example, an electronic digital certificate generating system may record, on the distributed ledger, information associated with the artifact.

As shown in block 306, the process flow 300 may include recording, on the distributed ledger, interests of each user of the group of users in the electronic digital certificates. For example, an electronic digital certificate generating system may record, on the distributed ledger, interests of each user of the group of users in the electronic digital certificates.

As shown in block 308, the process flow 300 may include receiving, from at least one user of the group of users, a request to combine the electronic digital certificates, where the request includes information identifying the electronic digital certificates. The request from the user may include information identifying each user of the group of users, shares assigned to each user of the group of users, information identifying a verified authority or verified authorities of the electronic digital certificates, and/or information identifying a verified authority of a combined electronic digital certificate.

As shown in block 310, the process flow 300 may include generating, based on the request and based on the electronic digital certificates, a combined electronic digital certificate. In some embodiments, after receiving the request the system is configured to verify ownership of the electronic digital certificates based on the distributed ledger and, when generating the combined electronic digital certificate, only generate the combined electronic digital certificate based on verifying the ownership.

As shown in block 312, the process flow 300 may include storing the combined electronic digital certificate on the distributed ledger, where the electronic digital certificate includes a smart contract, and where the smart contract links each of the electronic digital certificates to the combined electronic digital certificate. In some embodiments, the smart contract includes an assignment of rights to a verified authority of the combined electronic digital certificate. The rights of the verified authority may include a right to determine whether to authorize a proposed transfer of ownership of the electronic digital certificates and the combined electronic digital certificate. Additionally, or alternatively, the smart contract may include a set of rules governing proposed transfers of the electronic digital certificates and the combined electronic digital certificate.

As shown in block 314, the process flow 300 may include recording, on the distributed ledger, interests of the group of users in the combined electronic digital certificate. For example, an electronic digital certificate generating system may record, on the distributed ledger, interests of the group of users in the combined electronic digital certificate.

Process flow 300 may include additional embodiments, such as any single embodiment or any combination of embodiments described below and/or in connection with one or more other processes described elsewhere herein.

In a first embodiment, the process flow 300 may include, after receiving the request to combine the electronic digital certificates, verifying, based on the distributed ledger, ownership of the electronic digital certificates and, when generating the combined electronic digital certificate, only generating the combined electronic digital certificate based on verifying ownership.

In a second embodiment alone or in combination with the first embodiment, the process flow 300 may include determining, based on the request, shares in the combined electronic digital certificate for the group of users by determining for each user of the group of users a share of the shares and recording, on the distributed ledger and based on the shares, interests of the group of users in the combined electronic digital certificate.

In a third embodiment alone or in combination with any one of first or second embodiments, the process flow 300 may include determining values for the electronic digital certificates and, when determining the shares in the combined electronic digital certificate for the group of users, determine, for each user of the group of users, the share of the shares based on the values for the electronic digital certificates.

In a fourth embodiment alone or in combination with any one of the first through third embodiments, the smart contract may include an assignment of rights to a verified authority of the combined electronic digital certificate, where the rights include a right to determine whether to authorize a proposed transfer of ownership of the electronic digital certificates and the combined electronic digital certificate and/or a set of rules governing proposed transfers of the electronic digital certificates and the combined electronic digital certificate.

In a fifth embodiment alone or in combination with any one of the first through fourth embodiments, the process flow 300 may include receiving another request, from a first user of the group of users, to transfer ownership of the combined electronic digital certificate to a new user or a new group of users, compressing the recorded interests of the group of users, storing the compressed recorded interests of the group of users on the distributed ledger, and recording, on the distributed ledger and based on the other request, other interests of the new user or the new group of users in the combined electronic digital certificate. The other request may include information identifying the new user of the new group of users and/or shares assigned to the new user or each user of the new group of users. In some embodiments, compressing the recorded ownership interests may include removing redundant information, removing unnecessary information, and/or the like. For example, compressing the recorded ownership interests may include removing metadata associated with the recorded ownership interests. In some embodiments, the recorded interests are compressed by 99%. Additionally, or alternatively, the compressed recorded interests make up 1% of the electronic digital certificate.

In a sixth embodiment alone or in combination with any one of the first through fifth embodiments, the distributed ledger may include a compressed chain of ownership of the electronic digital certificates. In some embodiments, the compressed recorded interests make up 1% of the electronic digital certificate.

In a seventh embodiment alone or in combination with any one of the first through sixth embodiments, a first electronic digital certificate of the electronic digital certificates may include a first smart contract. The first smart contract may include an assignment of rights to a verified authority of the first electronic digital certificate, where the rights include a right to determine whether to authorize a proposed transfer of ownership of the first electronic digital certificate and/or a set of rules governing proposed transfers of the first electronic digital certificate.

In an eighth embodiment alone or in combination with any one of the first through seventh embodiments, the process flow 300 may include receiving another request, from a first user of the group of users, to transfer ownership of a first electronic digital certificate to another user, compressing a recorded interest of the first user in the first electronic digital certificate, storing the compressed recorded interest on the distributed ledger, and recording, on the distributed ledger and based on the other request, another interest of the other user in the first electronic digital certificate. The other request may include information identifying the other user, shares assigned to the other user, and/or information identifying a verified authority of the first electronic digital certificate. In some embodiments, compressing the recorded ownership interests may include removing redundant information, removing unnecessary information, and/or the like. For example, compressing the recorded ownership interests may include removing metadata associated with the recorded ownership interests. In some embodiments, the recorded interests are compressed by 99%. Additionally, or alternatively, the compressed recorded interests make up 1% of the electronic digital certificate.

In a ninth embodiment alone or in combination with any one of the first through eighth embodiments, the process flow 300 may include providing to another system associated with an insuring entity, unique identifiers of the electronic digital certificates, receiving, from the other system, information identifying an insurance policy, storing, on the distributed ledger, the information identifying the insurance policy, and associating, on the distributed ledger, the stored information identifying the insurance policy with the electronic digital certificates.

Although FIG. 3 shows example blocks of process flow 300, in some embodiments, process flow 300 may include additional blocks, fewer blocks, different blocks, or differently arranged blocks than those depicted in FIG. 3. Additionally, or alternatively, two or more of the blocks of process flow 300 may be performed in parallel.

FIG. 4 illustrates a process flow 400 for the generation of linked electronic digital certificates, in accordance with an embodiment of the invention. In some embodiments, the electronic digital certificate generating system and/or the like (e.g. similar to one or more of the systems described herein with respect to FIG. 1) may perform one or more of the steps of process flow 400.

As shown in block 402, the process flow 400 may include generating a first electronic digital certificate associated with a first artifact, where the first artifact is owned by a first group of users, and where the first electronic digital certificate has first properties. In some embodiments, the first artifact may be a physical artifact such as an art piece, a vehicle, real estate, and/or the like. Additionally, or alternatively, the first artifact may be a digital artifact such as software, a digital image, a digital sound file, a video, and/or the like.

As shown in block 404, the process flow 400 may include storing the first electronic digital certificate on a distributed ledger. For example, the electronic digital certificate generating system may store, on the distributed ledger, the first electronic digital certificate.

As shown in block 406, the process flow 400 may include recording, on the distributed ledger, first interests of the first group of users in the first electronic digital certificate. For example, the electronic digital certificate generating system may record, on the distributed ledger, the first interests of the first group of users in the first electronic digital certificate.

As shown in block 408, the process flow 400 may include receiving, from a second group of users, a request to generate a second electronic digital certificate associated with a second artifact owned by the second group of users, where the second group of users includes a subset of users from the first group of users, and where the request includes a subset of the first properties for generation in the second electronic digital certificate. The request may include information identifying each user in the second group of users, the shares assigned to each user in the second group of users, the subset of the first properties for generation in the second electronic digital certificate, and/or a verified authority of the second electronic digital certificate.

As show in block 410, the process flow 400 may include generating the second electronic digital certificate having the subset of the first properties. For example, the electronic digital certificate generating system may generate the second electronic digital certificate having a subset of the first properties of the first electronic digital certificate.

As shown in block 412, the process flow 400 may include recording, on the distributed ledger, second interests of the second group of users in the second electronic digital certificate. For example, the electronic digital certificate generating system may record, on the distributed ledger, second interests of the second group of users in the second electronic digital certificate.

As shown in block 414, the process flow 400 may include linking, in the distributed ledger, the first interests and the second interests. For example, the electronic digital certificate generating system may link, in the distributed ledger, the first interests and the second interests in the electronic digital certificate.

Process flow 400 may include additional embodiments, such as any single embodiment or any combination of embodiments described below and/or in connection with one or more other processes described elsewhere herein.

In a first embodiment, the first properties of the first electronic digital certificate may include a smart contract. The smart contract may include an assignment of rights to a verified authority of the first electronic digital certificate, where the rights include a right to determine whether to authorize a proposed transfer of interests in the first electronic digital certificate and/or a set of rules governing proposed transfers of interest in the first electronic digital certificate.

In a second embodiment alone or in combination with the first embodiment, the subset of the first properties may include the smart contract of the first properties of the first electronic digital certificate.

In a third embodiment alone or in combination with any one of the first or second embodiments, the second electronic digital certificate may have second properties where the second properties include a smart contract. The smart contract may include an assignment of rights to a verified authority of the second electronic digital certificate, where the rights include a right to determine whether to authorize a proposed transfer of interests in the second electronic digital certificate and/or a set of rules governing proposed transfers of interest in the second electronic digital certificate.

In a fourth embodiment alone or in combination with any one of the first through third embodiments, the distributed ledger may include a compressed chain of ownership of the first electronic digital certificate and another compressed chain of ownership of the second electronic digital certificate. In some embodiments, compressing the recorded ownership interests may include removing redundant information, removing unnecessary information, and/or the like. For example, compressing the recorded ownership interests may include removing metadata associated with the recorded ownership interests. In some embodiments, the recorded interests are compressed by 99%. Additionally, or alternatively, the compressed recorded interests make up 1% of the electronic digital certificate.

In a fifth embodiment alone or in combination with any one of the first through fourth embodiments, the process flow 400 may include providing, to another system associated with an insuring entity, a unique identifier of the second electronic digital certificate, receiving, from the other system, information identifying an insurance policy, storing, on the distributed ledger, the information identifying the insurance policy, and associating on the distributed ledger, the stored information identifying the insurance policy with the second electronic digital certificate.

In a sixth embodiment alone or in combination with any one of the first through fifth embodiments, the first artifact may include at least one of a first physical artifact or a first digital artifact, and the second artifact may include at least one of a second physical artifact or a second digital artifact.

In a seventh embodiment alone or in combination with any one of the first through sixth embodiments, the process flow 400 may include providing, to any one of a user from the first group of users, a user from the second group of users, or an additional user, an ownership record for the second electronic digital certificate, based on the distributed ledger. In some embodiments, the ownership record may include a list of owners of the second electronic digital certificate, a list of shareholders of the second electronic digital certificate, a list of verified authorities of the second electronic digital certificate, a timeline of owners of the second electronic digital certificate, a timeline of shareholders of the second electronic digital certificate, a timeline of verified authorities of the second electronic digital certificate, a list of smart contracts associated with the second electronic digital certificate, a value of the second electronic digital certificate, a value of each share of the second electronic digital certificate, and/or the like.

Although FIG. 4 shows example blocks of process flow 400, in some embodiments, process flow 400 may include additional blocks, fewer blocks, different blocks, or differently arranged blocks than those depicted in FIG. 4. Additionally, or alternatively, two or more of the blocks of process flow 400 may be performed in parallel.

FIG. 5 illustrates an exemplary schematic for the division of electronic digital certificates, in accordance with an embodiment of the invention. An electronic digital certificate 505 associated with an artifact may be generated and stored on a distributed ledger. Upon receiving a request from a user that owns and/or is associated with the electronic digital certificate 505 to divide ownership of the electronic digital certificate 505 amongst a group of users, the electronic digital certificate 505 may be divided 525 into multiple shares 520, 530, 540, 550, 560, and 570. In some embodiments, the shares of the electronic digital certificate 505 may be merged and/or compressed 353 to form a compressed chain of ownership 510 for the electronic digital certificate 505. In some embodiments, the compressed chain of ownership 510 may include compressed recorded interests of the group of users. Additionally, or alternatively, the recorded interests may be compressed by 99%. In some embodiments, the compressed recorded interests may make up 1% of the electronic digital certificate 505.

FIG. 6 illustrates an exemplary schematic for the generation of a combined electronic digital certificate, in accordance with an embodiment of the invention. Electronic digital certificates 620, 630, 640, 650, 660, and 670 may be generated, for each user of a group of users, and stored on a distributed ledger. After receiving, from at least one user of the group of users, a request to combine the electronic digital certificates 620, 630, 640. 650, 660, and 670, the system may generate 625 a combined electronic digital certificate 600. In some embodiments, the individual electronic digital certificates 620, 630, 640, 650, 660, and 670 may include a compressed chain of ownership 680. Additionally, or alternatively, the combined electronic digital certificate 600 may include a compressed chain of ownership 610. In some embodiments, the compressed chain of ownership 680 and/or 610 may include compressed recorded interests of the group of users. Additionally, or alternatively, the recorded interests may be compressed by 99%. In some embodiments, the compressed recorded interests may make up 1% of the combined electronic digital certificate 600.

FIG. 7 illustrates an exemplary schematic for the generation of linked electronic digital certificates, in accordance with an embodiment of the invention. An electronic digital certificate 705, owned by a first group of users, may be generated and stored on a distributed ledger. The electronic digital certificate 705 may have first properties 700. In some embodiments, the electronic digital certificate 705 may have shares 720, 730, 740, 750, 760, and 770 (e.g., ownership interests of the first group of users and/or the like). After receiving a request, from a second group of users, to generate a second electronic digital certificate associated with a second artifact, the second electronic digital certificate 795 may be generated 725. In some embodiments, the second group of users may be and/or include a subset of users from the first group of users. The second electronic digital certificate 795 may have second properties 785 and a subset of the first properties 700. In some embodiments, and as shown in FIG. 7, the second electronic digital certificate may have shares 780 and 790 (e.g., ownership interests of the second group of users and/or the like).

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that may direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments may be configured without departing from the scope and spirit of the invention. Therefore, it is to be understood that, within the scope of the appended claims, the invention may be practiced other than as specifically described herein.

To supplement the present disclosure, this application further incorporates entirely by reference the following commonly assigned patent applications:

| Docket Number | U.S. Pat. Application Ser. No. | Title | Filed On |
| --- | --- | --- | --- |
| 12632US1.014033.4115 | 17/394,851 | ELECTRONIC SYSTEM FOR DIVERGENT DISTRIBUTION OF ELECTRONIC DIGITAL CERTIFICATES | Concurrently herewith |
| 12633US1.014033.4116 | 17/394,860 | ELECTRONIC SYSTEM FOR CONVERGENT DISTRIBUTION OF ELECTRONIC DIGITAL CERTIFICATES | Concurrently herewith |

What is claimed is:

1. A system for distributing electronic digital certificates, the system comprising:
a blockchain-based digital rights management platform configured for permitting users to receive, manage, and display electronic digital certificates and offer the electronic digital certificates to other users;
at least one non-transitory storage device comprising computer program code stored thereon; and
at least one processing device coupled to the at least one non-transitory storage device, wherein the at least one processing device is configured to execute the computer program code to:
generate, using the blockchain-based digital rights management platform, a first electronic digital certificate associated with a first artifact, wherein the first artifact is owned by a first group of users, and wherein the first electronic digital certificate has first properties;
store the first electronic digital certificate on a distributed ledger associated with the blockchain-based digital rights management platform, wherein the first electronic digital certificate comprises a first smart contract, wherein the first smart contract comprises: an assignment of rights to a verified authority of the first electronic digital certificate, wherein the rights comprise a right to determine whether to authorize a proposed transfer of interests of the first electronic digital certificate and a set of rules governing proposed transfers of interest in the first electronic digital certificate;
record, on the distributed ledger, first interests of the first group of users in the first electronic digital certificate;
receive, from a second group of users, a request to generate a second electronic digital certificate associated with a second artifact owned by the second group of users, wherein the second group of users comprises at least a subset of users from the first group of users, and wherein the request comprises a subset of the first properties for generation in the second electronic digital certificate;

generate the second electronic digital certificate having the subset of the first properties;

record, on the distributed ledger, second interests of the second group of users in the second electronic digital certificate, wherein the second electronic digital certificate comprises a second smart contract;

compress a chain of ownership of the first electronic digital certificate with a chain of ownership of the second electronic digital certificate, wherein compressing comprises removing metadata associated with recorded ownership interests, wherein the compressed chain of ownership comprises one percent of an electronic digital certificate; and link, in the distributed ledger, the first interests and the second interests.

2. The system according to claim 1, wherein the subset of the first properties comprises the first smart contract of the first properties of the first electronic digital certificate.

3. The system according to claim 1, wherein the second electronic digital certificate has second properties, and wherein the second smart contract comprises:

an assignment of rights to a verified authority of the second electronic digital certificate, wherein the rights comprise a right to determine whether to authorize a proposed transfer of interests of the second electronic digital certificate; and a set of rules governing proposed transfers of interest in the second electronic digital certificate.

4. The system according to claim 1, wherein the at least one processing device is further configured to:

provide, to another system associated with an insuring entity, a unique identifier of the second electronic digital certificate;

receive, from the other system, information identifying an insurance policy;

store, on the distributed ledger, the information identifying the insurance policy; and associate, on the distributed ledger, the stored information identifying the insurance policy with the second electronic digital certificate.

5. The system according to claim 1, wherein the first artifact comprises at least one of a first physical artifact or a first digital artifact, and wherein the second artifact comprises at least one of a second physical artifact or a second digital artifact.

6. The system according to claim 1, wherein the at least one processing device is configured to provide, to any one of a user from the first group of users, a user from the second group of users, or an additional user, an ownership record for the second electronic digital certificate, based on the distributed ledger;

wherein the ownership record comprises at least one selected from the group consisting of: a list of owners of the second electronic digital certificate, a list of shareholders of the second electronic digital certificate, a list of verified authorities of the second electronic digital certificate, a timeline of owners of the second electronic digital certificate, a timeline of shareholders of the second electronic digital certificate, a timeline of verified authorities of the second electronic digital certificate, a list of smart contracts associated with the second electronic digital certificate, a value of the second electronic digital certificate, a value of each share of the second electronic digital certificate, and combinations thereof.

7. A computer program product for distributing electronic digital certificates, the computer program product comprising a non-transitory computer-readable medium comprising code causing a first apparatus to:

generate, using the blockchain-based digital rights management platform, a first electronic digital certificate associated with a first artifact, wherein the first artifact is owned by a first group of users, and wherein the first electronic digital certificate has first properties;

store the first electronic digital certificate on a distributed ledger associated with the blockchain-based digital rights management platform, wherein the first electronic digital certificate comprises a first smart contract, wherein the first smart contract comprises: an assignment of rights to a verified authority of the first electronic digital certificate, wherein the rights comprise a right to determine whether to authorize a proposed transfer of interests of the first electronic digital certificate and a set of rules governing proposed transfers of interest in the first electronic digital certificate;

record, on the distributed ledger, first interests of the first group of users in the first electronic digital certificate;

receive, from a second group of users, a request to generate a second electronic digital certificate associated with a second artifact owned by the second group of users, wherein the second group of users comprises at least a subset of users from the first group of users, and wherein the request comprises a subset of the first properties for generation in the second electronic digital certificate;

generate the second electronic digital certificate having the subset of the first properties;

record, on the distributed ledger, second interests of the second group of users in the second electronic digital certificate, wherein the second electronic digital certificate comprises a second smart contract;

compress a chain of ownership of the first electronic digital certificate with a chain of ownership of the second electronic digital certificate, wherein compressing comprises removing metadata associated with recorded ownership interests, wherein the compressed chain of ownership comprises one percent of an electronic digital certificate; and link, in the distributed ledger, the first interests and the second interests.

8. The computer program product according to claim 7, wherein the subset of the first properties comprises the first smart contract of the first properties of the first electronic digital certificate.

9. The computer program product according to claim 7, wherein the second electronic digital certificate has second properties, and wherein the second smart contract comprises:

an assignment of rights to a verified authority of the second electronic digital certificate, wherein the rights comprise a right to determine whether to authorize a proposed transfer of interests of the second electronic digital certificate; and a set of rules governing proposed transfers of interest in the second electronic digital certificate.

10. The computer program product according to claim 7, wherein the non-transitory computer-readable medium comprises code causing the first apparatus to:

provide, to another system associated with an insuring entity, a unique identifier of the second electronic digital certificate;
receive, from the other system, information identifying an insurance policy;
store, on the distributed ledger, the information identifying the insurance policy; and
associate, on the distributed ledger, the stored information identifying the insurance policy with the second electronic digital certificate.

11. The computer program product according to claim 7, wherein the first artifact comprises at least one of a first physical artifact or a first digital artifact, and wherein the second artifact comprises at least one of a second physical artifact or a second digital artifact.

12. The computer program product according to claim 7, wherein the non-transitory computer-readable medium comprises code causing the first apparatus to provide, to any one of a user from the first group of users, a user from the second group of users, or an additional user, an ownership record for the second electronic digital certificate, based on the distributed ledger;
wherein the ownership record comprises at least one selected from the group consisting of: a list of owners of the second electronic digital certificate, a list of shareholders of the second electronic digital certificate, a list of verified authorities of the second electronic digital certificate, a timeline of owners of the second electronic digital certificate, a timeline of shareholders of the second electronic digital certificate, a timeline of verified authorities of the second electronic digital certificate, a list of smart contracts associated with the second electronic digital certificate, a value of the second electronic digital certificate, a value of each share of the second electronic digital certificate, and combinations thereof.

13. A method for distributing electronic digital certificates, the method comprising:
generating, using the blockchain-based digital rights management platform, a first electronic digital certificate associated with a first artifact, wherein the first artifact is owned by a first group of users, and wherein the first electronic digital certificate has first properties;
storing the first electronic digital certificate on a distributed ledger associated with the blockchain-based digital rights management platform, wherein the first electronic digital certificate comprises a first smart contract, wherein the first smart contract comprises: an assignment of rights to a verified authority of the first electronic digital certificate, wherein the rights comprise a right to determine whether to authorize a proposed transfer of interests of the first electronic digital certificate and a set of rules governing proposed transfers of interest in the first electronic digital certificate;
recording, on the distributed ledger, first interests of the first group of users in the first electronic digital certificate;
receiving, from a second group of users, a request to generate a second electronic digital certificate associated with a second artifact owned by the second group of users, wherein the second group of users comprises at least a subset of users from the first group of users, and wherein the request comprises a subset of the first properties for generation in the second electronic digital certificate;
generating the second electronic digital certificate having the subset of the first properties;
recording, on the distributed ledger, second interests of the second group of users in the second electronic digital certificate, wherein the second electronic digital certificate comprises a second smart contract;
compressing a chain of ownership of the first electronic digital certificate with a chain of ownership of the second electronic digital certificate, wherein compressing comprises removing metadata associated with recorded ownership interests, wherein the compressed chain of ownership comprises one percent of an electronic digital certificate; and
linking, in the distributed ledger, the first interests and the second interests.

14. The method according to claim 13, wherein the subset of the first properties comprises the first smart contract of the first properties of the first electronic digital certificate.

15. The method according to claim 13, wherein the second electronic digital certificate has second properties, and wherein the second smart contract comprises:
an assignment of rights to a verified authority of the second electronic digital certificate, wherein the rights comprise a right to determine whether to authorize a proposed transfer of interests of the second electronic digital certificate; and
a set of rules governing proposed transfers of interest in the second electronic digital certificate.

\* \* \* \* \*